(12) United States Patent
Okude et al.

(10) Patent No.: US 7,464,157 B2
(45) Date of Patent: Dec. 9, 2008

(54) INFORMATION TRANSMISSION SYSTEM, INFORMATION TRANSMISSION METHOD, ELECTRIC DEVICE COMMUNICATION DEVICE, INFORMATION COMMUNICATION DEVICE, COMMUNICATION CONTROL PROGRAM

(75) Inventors: Takaaki Okude, Yamatotakada (JP); Masafumi Sadahira, Toyonaka (JP); Yoshiaki Watanabe, Yamatokoriyama (JP); Atsushi Nakayama, Yamatokoriyama (JP)

(73) Assignee: Panasonic Corporation, Osaka (JP)

( * ) Notice: Subject to any disclaimer, the term of this patent is extended or adjusted under 35 U.S.C. 154(b) by 318 days.

(21) Appl. No.: 10/544,453

(22) PCT Filed: Feb. 5, 2004

(86) PCT No.: PCT/JP2004/001190

§ 371 (c)(1),
(2), (4) Date: Aug. 4, 2005

(87) PCT Pub. No.: WO2004/077741

PCT Pub. Date: Sep. 10, 2004

(65) Prior Publication Data
US 2006/0155841 A1 Jul. 13, 2006

(30) Foreign Application Priority Data
Feb. 6, 2003 (JP) .............................. 2003-029213
Feb. 6, 2003 (JP) .............................. 2003-029214

(51) Int. Cl.
*G06F 15/173* (2006.01)
*G06F 15/16* (2006.01)
*G06F 11/00* (2006.01)
*G05B 11/01* (2006.01)

(52) U.S. Cl. .............................. 709/224; 700/12; 714/4
(58) Field of Classification Search ................. 709/230, 709/224; 700/12; 714/4
See application file for complete search history.

(56) References Cited

U.S. PATENT DOCUMENTS

| 6,320,875 | B2* | 11/2001 | Katseff et al. ............... 370/466 |
| 6,343,320 | B1* | 1/2002 | Fairchild et al. ............ 709/224 |
| 7,200,658 | B2* | 4/2007 | Goeller et al. .............. 709/224 |
| 2003/0054794 | A1* | 3/2003 | Zhang ........................ 455/403 |

(Continued)

FOREIGN PATENT DOCUMENTS

JP 2000-300430 10/2000

(Continued)

*Primary Examiner*—Andrew Caldwell
*Assistant Examiner*—Barak Nissan
(74) *Attorney, Agent, or Firm*—Wenderoth, Lind & Ponack, L.L.P.

(57) ABSTRACT

An information transfer system includes an information panel which controls electrical equipment and includes a first transmission and reception section. The system also includes a server which is communicably connected via a network to the information panel and includes a second transmission and reception section and a trigger generation section which generates a communication request trigger for making a request to communicate with the information panel. The first transmission and reception section transmits information based on a UDP protocol periodically to the server, the second transmission and reception section receives the information based on the UDP protocol. When the communication request trigger is generated, the second transmission and reception section transmits request response information based on the UDP protocol or based on a TCP protocol to a transmission-origin address of the information.

18 Claims, 14 Drawing Sheets

U.S. PATENT DOCUMENTS

2003/0182446 A1 * 9/2003 Koide et al. .................. 709/238

FOREIGN PATENT DOCUMENTS

| JP | 2001-136202 | 5/2001 |
|---|---|---|
| JP | 2002-027569 | 1/2002 |
| JP | 2002-215483 | 8/2002 |
| JP | 2002-247075 | 8/2002 |
| JP | 2002-330478 | 11/2002 |
| JP | 2003-018181 | 1/2003 |
| JP | 2004-005136 | 1/2004 |
| JP | 2004-120547 | 4/2004 |

* cited by examiner

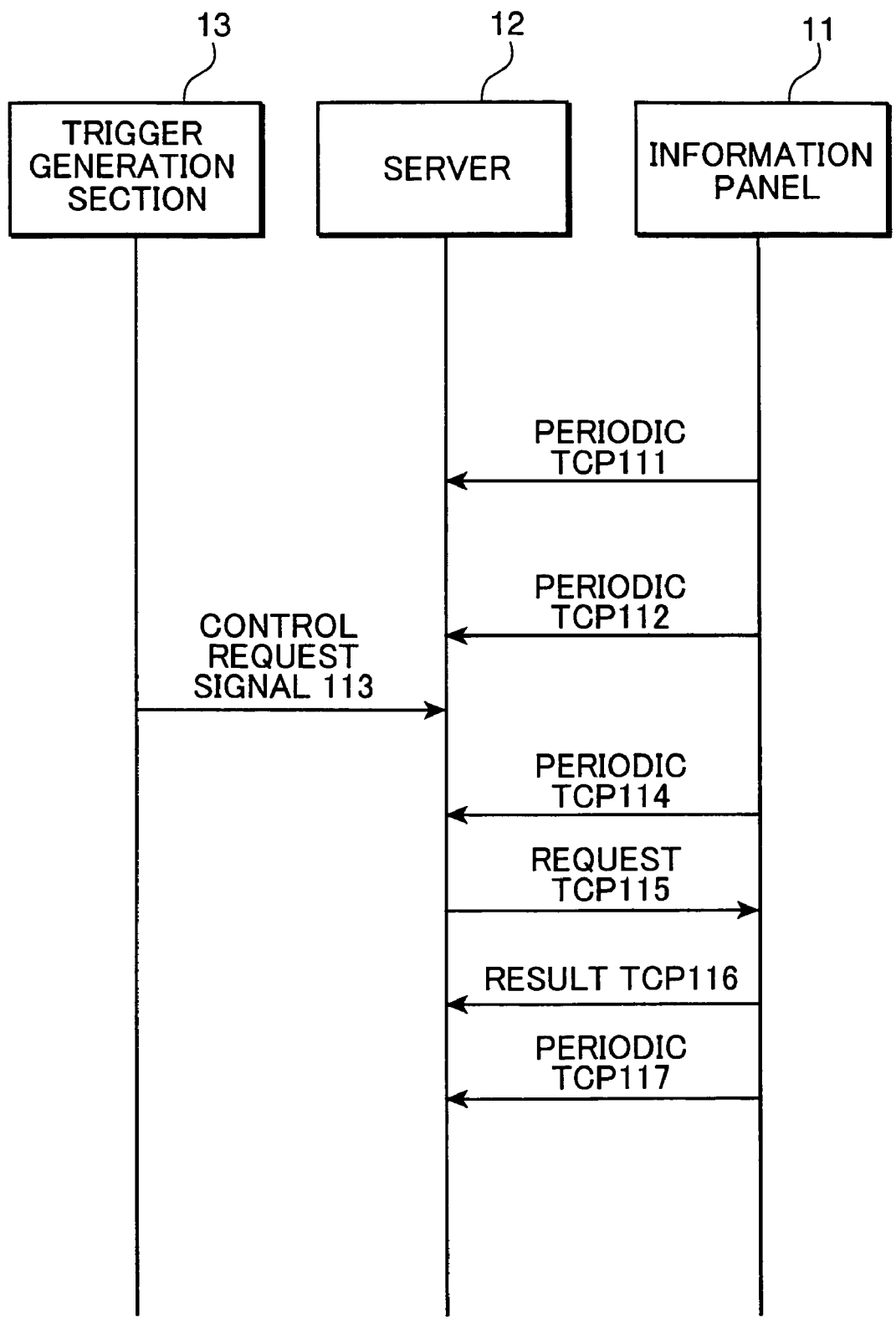

INFORMATION TRANSMISSION SYSTEM, INFORMATION TRANSMISSION METHOD, ELECTRIC DEVICE COMMUNICATION DEVICE, INFORMATION COMMUNICATION DEVICE, COMMUNICATION CONTROL PROGRAM

BACKGROUND OF THE INVENTION

1. Field of the Invention

The present invention relates to an information transfer system, an information transfer method, an electrical-equipment communication apparatus, an information communication apparatus and a computer-readable recording medium with a communication control program which allow a server that an information provider or the like has to transfer information via an information network to an information panel, or which transfer information via the information network so that the server can control the information panel itself, electrical equipment connected to the information panel or electrical equipment communicable to the information panel, or so that it can monitor their state.

2. Background of the Related Art

Conventionally, a system has been devised in which a server that an information provider or the like has transfers information via an information network (or a network) to an information panel, or information is transferred so that the server can control and monitor the information panel or the like. Such a prior art is disclosed, for example, in Japanese Patent Laid-Open No. 2000-300430 specification (Patent Document 1).

A cooking information system described in Patent Document 1 includes an information-provider server which can transmit and receive data via a predetermined communication network, a user terminal which can transmit and receive data via the communication network to and from the information-provider server, and a rice cooker which can transmit and receive data to and from the user terminal. Herein, the information-provider server corresponds to the server according to the present invention, the user terminal corresponds to the information panel according to the present invention, and the rice cooker corresponds to the electrical equipment according to the present invention.

In addition, FIG. 13 shows another prior art. FIG. 13 is a block diagram, showing the whole configuration of a conventional information transfer system. A conventional information transfer system 100 shown in FIG. 13 is configured by an information panel (which corresponds to the electrical-equipment communication apparatus in Claims) 101, and a server (which corresponds to the information communication apparatus in Claims) 102. The information panel 101 is made up of a transmission and reception section 103. The server 102 is made up of a transmission and reception section 104, a trigger generation section 105 which generates an information transfer request for the information panel 101 or a control monitoring request for the information panel 101, and a buffer 106 which stores a procedure or data on information transfer, or the like. The transmission and reception section 103 of the information panel 101 and the transmission and reception section 104 of the server 102 are connected by an information network (or a network) 107. The information network 107 is, for example, the Internet. As the trigger generation section 105, an operation switch, a timer, a sensor, or the like can be specifically mentioned. The buffer 106 is made up of a memory or the like.

FIG. 14 shows an information transfer procedure of the conventional information transfer system 100 shown in FIG. 13. In FIG. 14, information exchanges are shown by the information panel 101, the server 102 and the trigger generation section 105. Besides, reference numerals 111 to 117 denote the contents of each piece of information. Herein, in FIG. 14, periodic TCPs 111, 112, 114, 117 represents information which the information panel 101 sends periodically based on a TCP (or transmission control protocol) protocol. A request TCP 115 stands for request information which the server 102 issues periodically based on the TCP protocol. A result TCP 116 indicates result information which the information panel 101 gives periodically based on the TCP protocol.

Next, using the information transfer procedure shown in FIG. 14, an operation will be described of the conventional information transfer system 100 shown in FIG. 13. In this prior art, the information panel 101 is connected to the Internet 107. An IP address which the information panel 101 has is not connected to the Internet 107 through a global address that is constantly fixed, but connected to the Internet 107 through an IP address that is sequentially switched by a provider or the like. Therefore, the IP address of the information panel 101 is not a fixed address, and thus, the server 102 cannot become constantly aware of the IP address of the information panel 101. Hence, when a trigger is generated in the trigger generation section 105 of the server 102, the information panel 101 transmits IP address information periodically so as to inform the server 102 of the IP address of the information panel 101 at the point of time. This is the periodic TCPs 111, 112, 114, 117 shown in FIG. 14. In this way, the information panel 101 transmits the IP address periodically to the server 102, so that the server 102 can certainly transfer the information to the information panel 101. Thus, it can certainly control the information panel 101 and can certainly monitor the state of the information panel 101. When a control request trigger for the information panel 101 is generated in the trigger generation section 105, the trigger generation section 105 issues a control request signal 113. However, at this time, the server 102 does not recognize the IP address of the information panel 101 at the point of time. Therefore, it cannot issue a request signal instantly to the information panel 101, and then, temporarily stores, in the buffer 106, the fact that there is the control request for the information panel 101. After the control request signal 113 is issued, when the server 102 receives the periodic TCP 114 transferred to the server 102, the server 102 can recognize the IP address of the information panel 101 at the point of time. Thereby, the transmission and reception section 104 of the server 102 can issue the request TCP 115 to the transmission and reception section 103 of the information panel 101. The information panel 101 which has received the request TCP 115 executes a necessary processing and transmits its result as the result TCP 116 to the server 102. As a result, the information transfer system 100 completes a series of information transfers on the control request trigger which is generated in the trigger generation section 105.

However, in the conventional information transfer system 100, as shown in FIG. 14, during the period of time from the generation of the control request trigger to the completion of the control in the information panel 101 or the server 102, an additional time is required from the generation of the control request signal 113 to the generation of the periodic TCP 114. If the control request signal 113 is generated immediately before the periodic TCP 114, such an extra time is relatively short. However, if the control request signal 113 is generated shortly after the periodic TCP 112, a control delay is caused which corresponds to most time of the interval at which the periodic TCPs are transmitted. Hence, it is difficult to provide information or execute control in real time. Besides, if the interval of time between the periodic TCPs is shortened, the additional time can be relatively short. However, in this case, processing tasks in the information panel 101 or the server 102 have to be more frequently performed. Hence, a disadvantage arises in that the network 107 always stays in a busy state, thus making it difficult to shorten such an interval beyond its necessity.

BRIEF SUMMARY OF THE INVENTION

In order to resolve the above described disadvantages, an object of the present invention is to provide an information transfer system, an information transfer method, an electrical-equipment communication apparatus, an information communication apparatus and a computer-readable recording medium with a communication control program which are capable of shortening the interval of time from the generation of a control request in the information communication apparatus to the transfer of information to the electrical-equipment communication apparatus, and providing information or executing control in real time.

The objects, characteristics, aspects and advantages of the present invention will be more obvious in the following detailed description and attached drawings.

BRIEF DESCRIPTION OF THE DRAWINGS

FIG. 14 is a diagram, showing an information transfer procedure of the conventional information transfer system shown in FIG. 13.

DETAILED DESCRIPTION OF THE INVENTION

Figure 1:
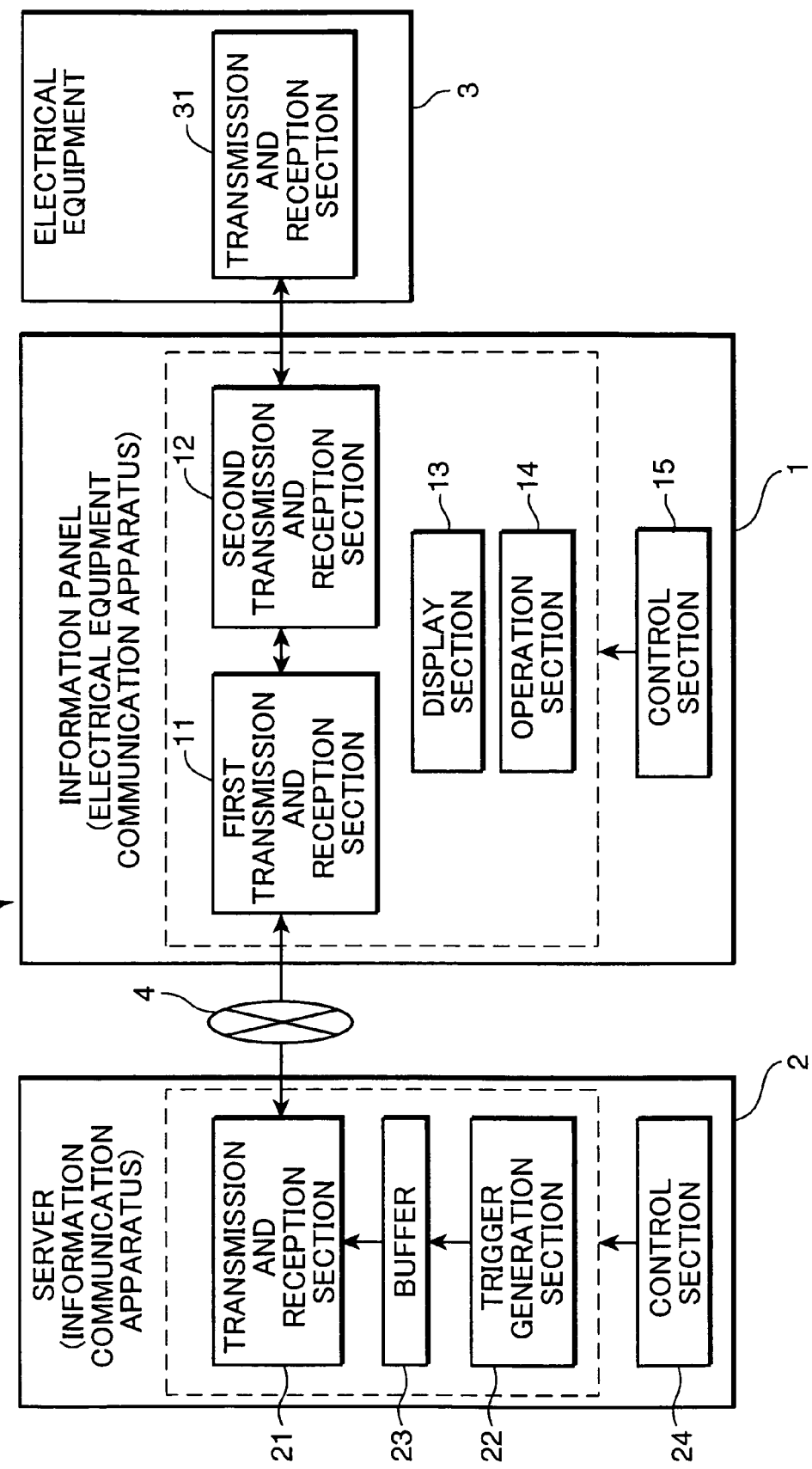
FIG. 1 is a block diagram, showing the whole configuration of an information transfer system according to a first embodiment of the present invention.

Hereinafter, preferred embodiments of the present invention will be described with reference to the drawings. Herein, in each figure, the same configurations are given the identical reference numerals, and thus, their description is omitted.

First Embodiment

First, description will be given about the configuration of an information transfer system according to a first embodiment of the present invention. FIG. 1 is a block diagram, showing the entire configuration of an information transfer system according to the first embodiment. An information transfer system 10 shown in FIG. 1 is configured by an information panel (electrical-equipment communication apparatus) 1, a server (information communication apparatus) 2, and electrical equipment 3.

The information panel 1 is communicably connected to the server 2, via an information network 4 (hereinafter, referred to as the network 4). The information panel 1 is, for example, a controller which controls the electrical equipment 3. The information panel 1 is made up of a first transmission and reception section 11, a second transmission and reception section 12, a display section 13, an operation section 14, and a control section 15. Herein, the information panel 1 according to this embodiment is a controller which controls the electrical equipment 3. However, the present invention is not limited only to this. It may also be, for example, a remote controller, a personal computer, a television, or the like. In addition, the information panel 1 may also control a plurality of pieces of electrical equipment, not only a single piece of electrical equipment.

The first transmission and reception section 11 transmits information via the network 4 to a transmission and reception section 21 of the server 2. In addition, it receives information which is transmitted via the network 4 by the transmission and reception section 21 of the server 2. The second transmission and reception section 12 transmits information to a transmission and reception section 31 of the electrical equipment 3, and receives information which is transmitted by the transmission and reception section 31 of the electrical equipment 3. The display section 13 displays an operational state of the electrical equipment 3, or the like. The operation section 14 is used in the case where the electrical equipment 3 is operated by the information panel 1. It accepts operation information for operating the information panel 1. The control section 15 is made up, for example, of a CPU (or central processing unit). It controls the first transmission and reception section 11, the second transmission and reception section 12, the display section 13 and the operation section 14.

The server 2 is communicably connected via the network 4 to the information panel 1. It is made up of the transmission and reception section 21, a trigger generation section 22, a buffer 23, and a control section 24. The transmission and reception section 21 transmits information via the network 4 to the first transmission and reception section 11 of the information panel 1. In addition, it receives information which is transmitted via the network 4 by the first transmission and reception section 11 of the information panel 1. The first transmission and reception section 11 of the information panel 1 and the transmission and reception section 21 of the server 2 is connected by the network 4. The network 4 is, for example, the Internet. The trigger generation section 22 is made up, for example, of a switch, a timer, a sensor, or the like. It generates a communication request signal as a trigger which makes a request to communicate with the information panel 1. The buffer 23 is made up, for example, of a memory or the like. It stores information such as a procedure and data on information transfer. The control section 24 is made up, for example, of a CPU, and controls the transmission and reception section 21, the trigger generation section 22 and the buffer 23. Herein, in this embodiment, the server 2 may also be information equipment, such as a personal computer, a portable terminal and a mobile phone.

Herein, a communication control program is stored in advance in an external storage unit inside of the information panel 1. It is used to control the information panel 1 which is communicably connected via the network 4 to the server 2 including the transmission and reception section 21 that transmits and receives information via the network 4 and the trigger generation section 22 that generates a communication request trigger for making a request to communicate. Besides, the communication control program for controlling the information panel 1 may also be stored in a computer-readable recording medium which is configured by a CD-ROM, a DVD-ROM, a flexible disk, or the like. In that case, using a computer-readable record-medium drive unit which is configured by a CD-ROM drive, a DVD-ROM drive, a flexible-disk drive, or the like, the communication control program for controlling the information panel 1 which is read out of the recording medium is installed in the external storage unit. In addition, if the communication control program for controlling the information panel 1 is stored in another computer or the like which is connected via the network 4, the communication control program for controlling the information panel 1 may also be downloaded via the network 4 from the computer or the like.

Furthermore, a communication control program is stored beforehand in an external storage unit inside of the server 2. It is used to control the server 2 which is communicably connected via the network 4 to the information panel 1 including the first transmission and reception section 11 that transmits and receives information via the network 4. Besides, the communication control program for controlling the server 2 may also be stored in a computer-readable recording medium which is configured by a CD-ROM, a DVD-ROM, a flexible disk, or the like. In that case, using a computer-readable recording medium drive unit which is configured by a CD-ROM drive, a DVD-ROM drive, a flexible-disk drive, or the like, the communication control program for controlling the server 2 which is read out of the recording medium is installed in the external storage unit. In addition, if the communication control program for controlling the server 2 is stored in another computer or the like which is connected via the network 4, the communication control program for controlling the information panel 1 may also be downloaded, via the network 4, from the computer or the like.

The electrical equipment 3 is connected to the information panel 1 so as to communicate and is made up of the transmission and reception section 31. The transmission and reception section 31 transmits information to the second transmission and reception section 12 of the information panel 1 and receives information which is transmitted by the second transmission and reception section 12 of the information panel 1. The electrical equipment 3 is made up, for example, of various kinds of equipment, such as an air conditioner, a refrigerator, a washing machine, a microwave oven, a rice cooker, a vacuum cleaner, cooking equipment, a gas hot-water supplier, a central heating system, an electrical hot-water heater and a household cogeneration apparatus. Herein, in this embodiment, the electrical equipment 3 is described as a gas hot-water supplier.

Herein, in this embodiment, the information panel 1 corresponds to an example of the electrical-equipment communication apparatus. The server 2 corresponds to an example of the information communication apparatus. The first transmission and reception section 11 and the second transmission and reception section 12 correspond to an example of the transmitting and receiving means of the electrical-equipment communication apparatus. The transmission and reception section 21 corresponds to an example of the transmitting and receiving means of the information communication apparatus. The trigger generation section 22 corresponds to an example of the trigger generating means.

Figure 2:
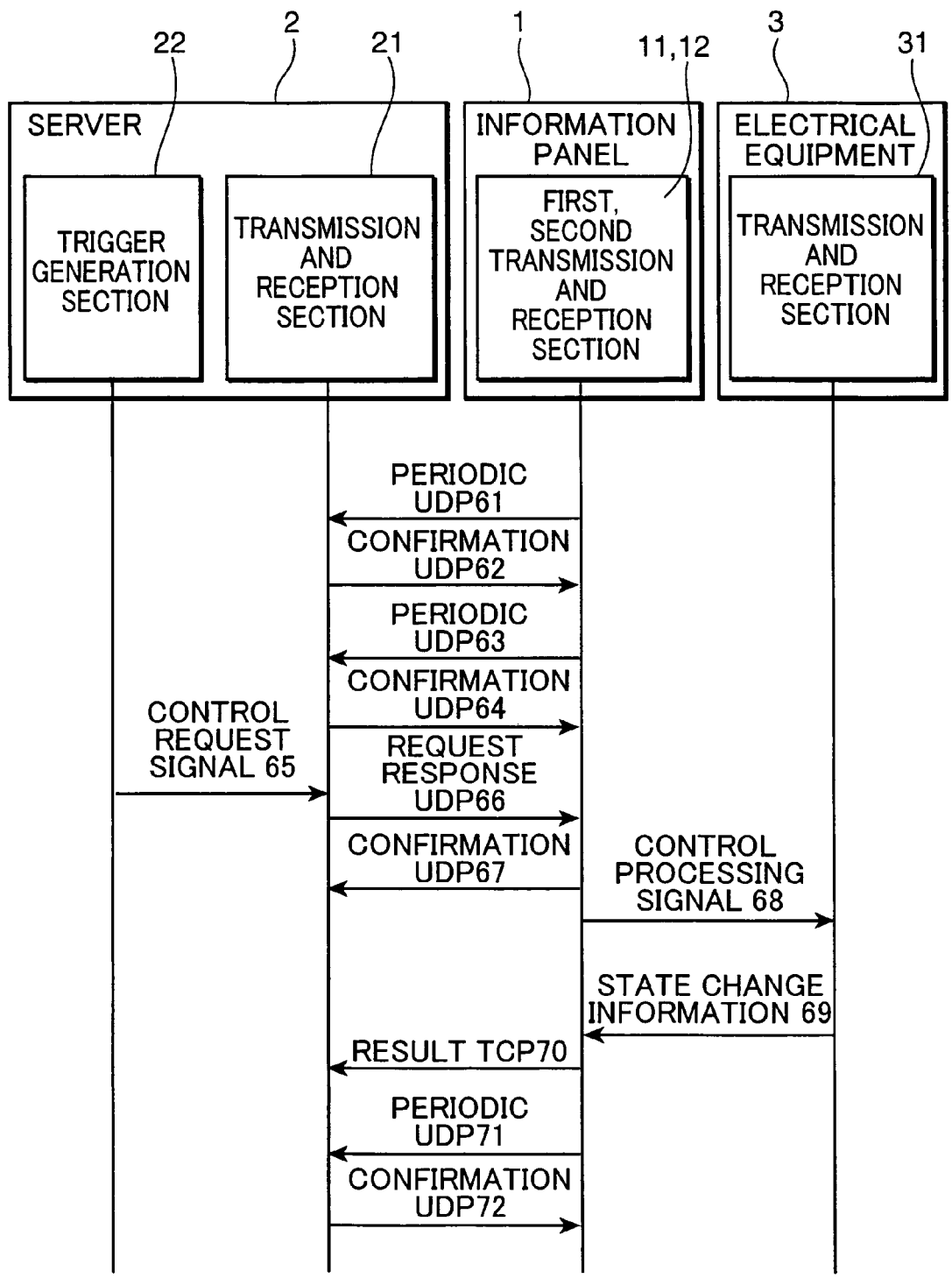
FIG. 2 is a diagram, showing an information transfer procedure of the information transfer system according to the first embodiment shown in FIG. 1.

FIG. 2 is a diagram, showing an information transfer procedure of the information transfer system according to the first embodiment shown in FIG. 1. FIG. 2 shows the exchange of information by the first transmission and reception section 11 and the second transmission and reception section 12 of the information panel 1, the transmission and reception section 21 of the server 2, the transmission and reception section 31 of the electrical equipment 3 and the trigger generation section 22 of the server 2. Reference numerals 61 to 72 designate the contents of each piece of information. Herein, in FIG. 2, periodic UDPs 61, 63, 71 represent IP address information which the information panel 1 transmits periodically based on a UDP (or user datagram protocol) protocol. Confirmation UDPs 62, 64, 72 represent confirmation information which the server 2 issues, for the periodic UDPs 61, 63, 71 from the information panel 1, based on the UDP protocol. A request response UDP 66 indicates request response information which the server 2 issues based on the UDP protocol. A confirmation UDP 67 indicates confirmation information which the information panel 1 issues, for the request response UDP 66 from the server 2, based on the UDP protocol. A result TCP 70 indicates result information which the information panel 1 issues based on a TCP (or transmission control protocol) protocol. For example, the result TCP 70 is state-change data on the electrical equipment 3, a response result to a control request, or the like. For example, if the electrical equipment 3 is a gas hot-water supplier, then using the result TCP 70, information on the gas hot-water supplier is transferred through the information panel 1 to the server 2. Such information includes, as a control instruction for the gas hot-water supplier, starting to supply hot water to a bath or finishing hot-water supply after a predetermined time elapses and the volume of hot water supplied into a bathtub reaches a proper quantity. Of course, the electrical equipment 3 may also be equipment except a gas hot-water supplier, and needless to say, a control request can also be other than starting to supply hot water to a bath.

Herein, in this embodiment, a UDP protocol is used as the connectionless-type protocol, and a TCP protocol is used as the connection-type protocol. However, the present invention is not limited only to this. Connectionless-type protocols other than a UDP protocol may also be used, and connection-type protocols other than a TCP protocol may also be used.

Next, the operation of the information transfer system 10 shown in FIG. 1 will be described using the information transfer procedure shown in FIG. 2. In this embodiment, the information panel 1 is connected to the network (or the Internet) 4. An IP address which the information panel 1 has is not connected to the network 4 through a global address that is constantly fixed, but connected to the network 4 through an IP address that is sequentially switched by a provider or the like. Therefore, the IP address of the information panel 1 is not a fixed address, and thus, the server 2 cannot become constantly aware of the IP address of the information panel 1. Hence, when a trigger is generated in the trigger generation section 22 of the server 2, the information panel 1 transmits IP address information periodically so as to inform the server 2 of the IP address of the information panel 1 at the point of time. This is the periodic UDPs 61, 63, 71 shown in FIG. 2. In this way, the information panel 1 transmits the IP address information periodically to the server 2, so that the server 2 can certainly transfer the information to the information panel 1. Thus, it can certainly control the information panel 1 and can certainly monitor the state of the information panel 1.

Herein, the interval of time from the transmission of the periodic UDP 61 to the transmission of the periodic UDP 63 by the first transmission and reception section 11 of the information panel 1 is preset, for example, at two minutes. Besides, there is a case where if a certain time passes, the session of the information panel 1 and the server 2 is automatically opened. In this case, the first transmission and reception section 11 of the information panel 1 may also transmit a periodic UDP by detecting the session being opened.

In addition, the first transmission and reception section 11 of the information panel 1 may also learn the time from the establishment of a session of the information panel 1 and the server 2 to the opening of the session. In that case, the interval of time at which a periodic UDP is transmitted can be set according to the learned time. Specifically, the first transmission and reception section 11 of the information panel 1 lengthens, little by little, the interval of time at which a periodic UDP is transmitted after the previous periodic UDP has been transmitted. If it cannot receive a confirmation UDP, it shortens the time interval from the transmission of a periodic UDP to the transmission of the following periodic UDP.

In this way, the period of time is learned from the establishment of a session of the information panel 1 and the server 2 to the opening of the session. Then, according to the learned time, the time interval is set from the transmission of information based on a connectionless-type protocol to the transmission of information based on the next connectionless-type protocol. Therefore, the session of the information panel 1 and the server 2 can always be kept established, thus avoiding a state where the session stays opened. This is especially effective in a case where the session is automatically opened.

For example, when a control request trigger for the electrical equipment 3 which can communicate with the information panel 1 is generated in the trigger generation section 22 of the server 2, the trigger generation section 22 issues a control request signal 65 and stores its contents in the buffer 23. At this time, between the server 2 and the information panel 1, a session is established by the periodic UDP 63 which is issued from the information panel 1. Then, the transmission and reception section 21 of the server 2 promptly transmits the request response UDP 66 to the IP address of the information panel 1 at the point of time, or the transmission-origin address of the periodic UDP 63.

Herein, for example, if the periodic UDP 63 is a signal based on a TCP protocol, then, at the point of time when the communication of the periodic signal of the TCP protocol is completed, a series of pieces of processing is executed such as returning an ACK signal from the server 2 to the information panel 1. Thereafter, the session of the server 2 and the information panel 1 is opened. Therefore, at the point of time when the session has been opened, the server 2 cannot become aware of the IP address of the information panel 1. This makes it impossible for the transmission and reception section 21 of the server 2 to transmit the request response UDP 66 instantly when the control request signal 65 has been generated.

On the other hand, in this embodiment, the periodic UDP 63 is a signal based on a UDP protocol, and thus, the session is not necessarily opened at the point of time when the communication is completed. Therefore, when the control request signal 65 is produced, the server 2 is aware of the IP address of the information panel 1 at the point of time. Hence, the transmission and reception section 21 of the server 2 can transmit the request response UDP 66 immediately to the information panel 1. The information panel 1 which has received the request response UDP 66 transfers a control processing signal 68 from the second transmission and reception section 12 to the transmission and reception section 31 of the electrical equipment 3, so that the electrical equipment 3 can be controlled as prescribed. Herein, the prescribed control means, for example, various kinds of control such as default control and timer control which the electrical equipment 3 has, various types of setting such as timer setting, or the like. When the state of the electrical equipment 3 changes according to the result of control by the control processing signal 68 or the like, state change information 69 is transferred from the electrical equipment 3 to the information panel 1. Then, the result is transferred as the result TCP 70 to the server 2, and the series of pieces of information transfer processing is completed. Herein, the state of the electrical equipment 3 indicates an electrically-detectable state of the electrical equipment 3.

Herein, for example, let's assume the electrical equipment 3 which can communicate with the information panel 1 to be a gas hot-water supplier. If a control request for the gas hot-water supplier which is generated in the trigger generation section 22 of the server 2 is a request to start hot-water supply to a bath, the transmission and reception section 21 of the server 2 transmits the request response UDP 66 to start the hot-water supply to the bath to the first transmission and reception section 11 of the information panel 1. The first transmission and reception section 11 of the information panel 1 receives the request response UDP 66 from the server 2. The second transmission and reception section 12 of the information panel 1 transmits, to the gas hot-water supplier, the control processing signal 68 for starting the hot-water supply to the bath.

Through the above described series of information transfers, the gas hot-water supplier starts to supply hot water to the bath. Besides, the transmission and reception section 31 of the gas hot-water supplier transmits, to the second transmission and reception section 12 of the information panel 1, the state change information 69 on a change in the state of the gas hot-water supplier. It includes, for example, starting to supply hot water to the bath, finishing the hot-water supply after a predetermined time elapses and the volume of hot water supplied to the bath reaches a proper quantity, or the like. The second transmission and reception section 12 of the information panel 1 receives the state change information 69 from the gas hot-water supplier. The first transmission and reception section 11 of the information panel 1 transmits the result TCP 70 to the transmission and reception section 21 of the server 2. The transmission and reception section 21 of the server 2 receives the result TCP 70 which has been transmitted by the first transmission and reception section 11 of the information panel 1, so that the series of pieces of information transfer processing is completed. Naturally, the electrical equipment 3 may also be equipment except a gas hot-water supplier, and the information network 4 may also be except for the Internet. Needless to say, a control request can also be other than starting to supply hot water to a bath. Besides, it is natural that the information panel 1 continues to send out a periodic UDP like the periodic UDP 71, even after the series of information transfers is completed.

Herein, a periodic UDP does not necessarily continue to be sent out at a fixed interval, as long as it is sent out substantially at a certain interval. In addition, for a signal based on a UDP protocol, an ACK signal is not returned when it is transferred. Hence, it becomes less reliable than a signal based on a TCP protocol. Therefore, if the transmission and reception section 21 of the server 2 receives the periodic UDPs 61, 63, 71, it transmits the confirmation UDPs 62, 64, 72 to the first transmission and reception section 11 of the information panel 1. In this way, for the periodic UDPs 61, 63, 71, the confirmation UDPs 62, 64, 72 are sent out from the server 2 to the information panel 1, so that the information transfer becomes more reliable. Moreover, in the same way, the confirmation UDP 67 is sent out for the request response UDP 66. Thereby, the above-described disadvantages can be resolved, thus heightening the reliability of the information transfer.

Furthermore, the information panel 1 includes the display section 13 or the operation section 14. Thereby, in the information panel 1, information can be confirmed, such as the state of the electrical equipment 3 and the confirmation of the communication state with the server 2. This presents an extremely great advantage, such as setting the contents of information sending.

Herein, the electrical equipment 3 is not necessarily controlled by communicating with the information panel 1. Needless to say, it may also be directly connected to a terminal of the information panel 1 or the like, so that it can be controlled. Besides, the request response UDP 66 may also be a signal of a TCP protocol. In that case, there is no need for the confirmation UDP 67 with respect to the request response UDP 66. Thereby, using a signal based on a TCP protocol, a request response information can be certainly transmitted.

Moreover, in this embodiment, description is given about the transfer of information for controlling the electrical equipment 3. Needless to say, in the same was as described above, the present invention can be applied to the control of the information panel 1 itself, or the transfer of information like life information, such as a weather forecast, a timetable, the present time, a gas consumption, a power consumption, a water consumption, a gas rate, a power rate and a water rate, or the like. Furthermore, the electrical equipment 3 according to this embodiment may also be various meters, such as a gas meter, an electric-power meter and a water meter. If the electrical equipment 3 is various meters such as a gas meter, an electric-power meter and a water meter, the information transfer system may also be applied to an information transfer for executing control such as the remote cutoff and remote return (opening) of a meter. Moreover, needless to say, the state change information 69 and the result TCP 70 may also be sent out, not only when a change is made in the state of the electrical equipment 3, the information panel 1, or the like, but also when the state at a fixed point of time of the electrical equipment 3, the information panel 1 or the like is transferred at regular intervals.

Hence, before a communication request is generated in the trigger generation section 22, the transmission and reception section 21 of the server 2 receives information (or a periodic UDP) based on a connectionless-type protocol which is periodically transmitted from the information panel 1. Thereby, the session remains connected between it and the first transmission and reception section 11 of the information panel 1. Therefore, the transmission and reception section 21 can issue, to the transmission-origin address of the periodic UDP, request response information (or a request response UDP) based on a connectionless-type protocol or request response information (or a request response TCP) based on a connection-type protocol, instantly without waiting for the following periodic UDP. Thus, the information transfer can be executed without a time lag from the communication-request generation in the trigger generation section 22 to the transmission of the request response UDP or request response TCP. Therefore, the time interval can be shortened from the generation of a control request in the server 2 to the transfer of information to the information panel 1. Thereby, information provision or control can be realized in real time.

In addition, result information based on a connection-type protocol is transmitted to the transmission-origin address of request response information, so that the state of the electrical-equipment communication apparatus (or the information panel 1) can be transferred. Besides, when information (or a periodic UDP) based on a connectionless-type protocol which is periodically transmitted from the first transmission and reception section 11 of the information panel 1 has been received by the transmission and reception section 21 of the server 2, confirmation information (or a confirmation UDP) based on a connectionless-type protocol or confirmation information (or a confirmation TCP) based on a connection-type protocol is transmitted to the transmission-origin address of the periodic UDP. This makes it possible to execute a transfer confirmation of the periodic UDP of which a communication transfer confirmation is not made as a basic protocol.

Furthermore, when request response information (or a request response UDP) based on a connectionless-type protocol which is transmitted from the transmission and reception section 21 of the server 2 has been received by the first transmission and reception section 11 of the information panel 1, confirmation information (or a confirmation UDP) based on a connectionless-type protocol or confirmation information (or a confirmation TCP) based on a connection-type protocol is transmitted for the request response information. This makes it possible to execute a transfer confirmation of the request response UDP of which a communication transfer confirmation is not made as a basic protocol.

Moreover, when the second transmission and reception section 12 of the information panel 1 has received request response information based on a connection-type protocol or request response information based on a connectionless-type protocol, it transmits a control signal to the transmission and reception section 31 of the electrical equipment 3. Thereby, the electrical equipment 3 which is connected to the information panel 1 can be controlled. Besides, the server 2 can receive change state data on the information panel 1 or the electrical equipment 3, so that it can recognize the state of the information panel 1 or the electrical equipment 3 which has been changed through the control.

Figure 3:
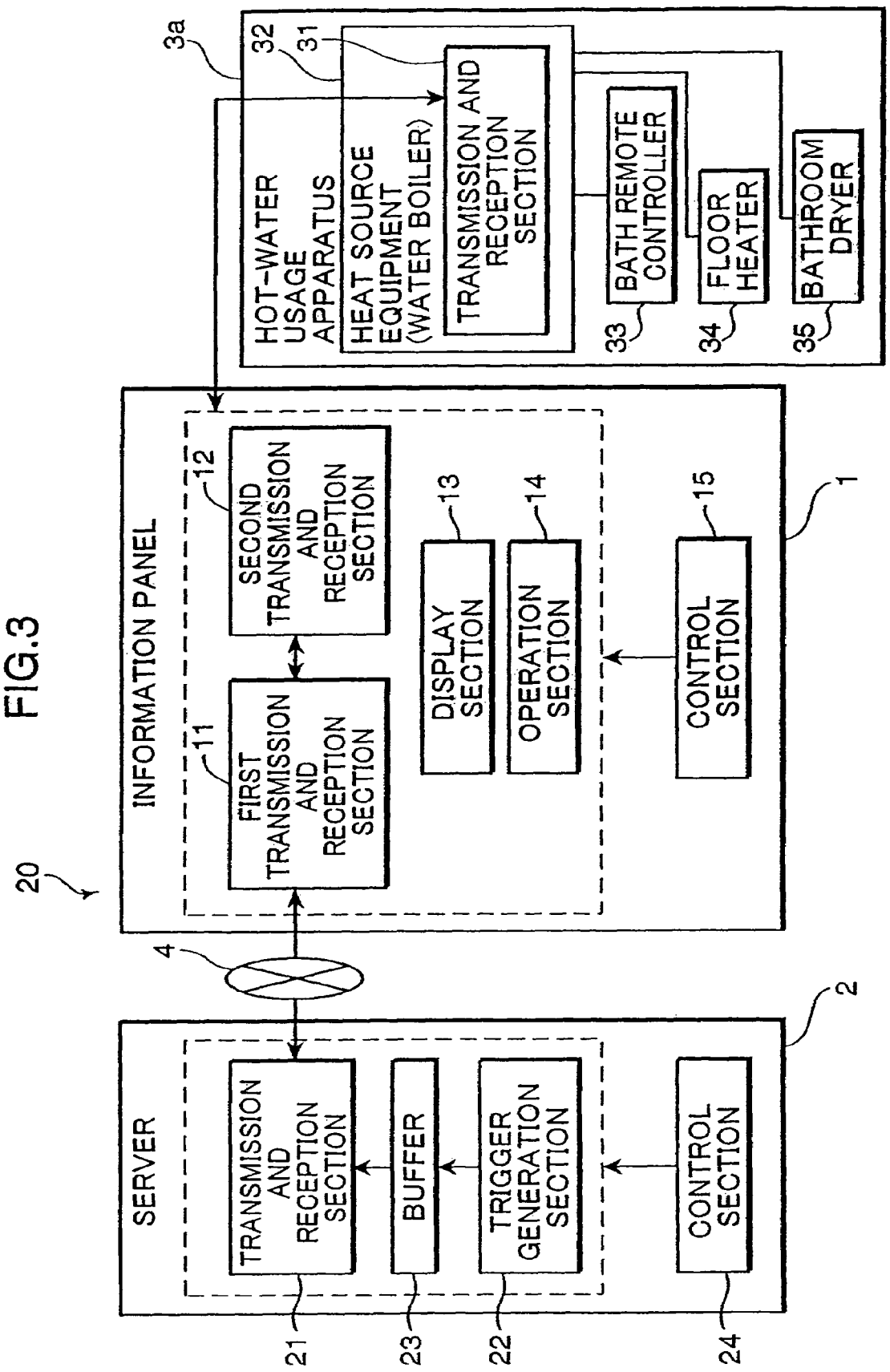
FIG. 3 is a block diagram, more specifically showing an information transfer according to the first embodiment.

Herein, the information transfer according to the first embodiment will be more specifically described. FIG. 3 is a block diagram, more specifically showing the information transfer according to the first embodiment. Herein, in the following description, an example is described in which the electrical equipment is applied as a hot-water usage apparatus. The hot-water usage apparatus is an apparatus which creates hot water using an energy source such as gas, electric power and oil, and supplies the hot water which is used directly in a bath, a kitchen, a washroom or the like. In addition, it is an apparatus which has the function of, using the hot water it creates, floor heating, bathroom heating, bathroom drying, heating by a fan heater or an air conditioner, or the like.

An information transfer system 20 shown in FIG. 3 is configured by the information panel 1, the server 2 and a hot-water usage apparatus 3a. Herein, the configuration of the information panel 1 and the server 2 in the information transfer system 20 shown in FIG. 3 is the same as the configuration of the information panel 1 and the server 2 in the information transfer system 10 shown in FIG. 1. Hence, it is given the same reference numerals, and thus, its detailed description is omitted. Therefore, in the following description, only the configurations are described which are different from those of the information transfer system 10 shown in FIG. 1.

The information panel 1 is communicably connected to the server 2, via an information network 4 (hereinafter, referred to as the network 4). It is, for example, a controller which controls the hot-water usage apparatus 3a. The information panel 1 is made up of a first transmission and reception section 11, a second transmission and reception section 12, a display section 13, an operation section 14, and a control section 15. Herein, the information panel 1 according to this embodiment is a controller which controls the hot-water usage apparatus 3a. However, the present invention is not limited only to this. It may also be, for example, a remote controller, a personal computer, a television, or the like. In addition, the information panel 1 may also control not only the hot-water usage apparatus 3a but also another piece of electrical equipment.

The server 2 is communicably connected via the network 4 to the information panel 1. It is made up of the transmission and reception section 21, a trigger generation section 22, a buffer 23, and a control section 24. Herein, in this embodiment, the server 2 may also be information equipment, such as a personal computer, a portable terminal and a mobile phone.

The hot-water usage apparatus 3a is formed by a heat source equipment 32, a bath remote controller 33, a floor heater 34, and a bathroom dryer 35. The heat source equipment 32 creates and supplies hot water, using gas, electricity or oil as an energy source. It is a so-called water boiler. The heat source equipment 32 has a hot-water supplying function of supplying the hot water it creates to a bath, a kitchen, a washroom, or the like. It also has a heating function of using the hot water it creates as a heat source of floor heating, a bathroom heater, a bathroom dryer, a fan heater, an air conditioner, or the like. Besides, the heat source equipment 32 is provided with the transmission and reception section 31. The transmission and reception section 31 transmits information to the second transmission and reception section 12 of the information panel 1, and receives information which is transmitted by the second transmission and reception section 12 of the information panel 1. The bath remote controller 33 controls a hot-water supply or the like and is mainly installed in a bath. The floor heater 34 warms a floor, using the hot water which is created by the heat source equipment 32. The bathroom dryer 35 dries a bathroom, using the hot water which is created by the heat source equipment 32. Herein, the floor heater 34 and the bathroom dryer 35 may also be equipment which uses the hot water of a bathroom heater, a fan heater, an air conditioner, or the like.

Next, the operation of the information transfer system 20 shown in FIG. 3 will be described. Herein, the following description is given with reference to the information transfer procedure shown in FIG. 2.

The first transmission and reception section 11 of the information panel 1 periodically transmits, to the server 2, IP address information (or a periodic UDP) based on a UDP protocol. The transmission and reception section 21 of the server 2 receives the periodic UDP which is transmitted by the first transmission and reception section 11 of the information panel 1. Then, it transmits confirmation information (or a confirmation UDP) based on a UDP protocol to the first transmission and reception section 11 of the information panel 1. The first transmission and reception section 11 of the information panel 1 receives the confirmation UDP which is transmitted by the transmission and reception section 21 of the server 2.

Herein, in the trigger generation section 22 of the server 2, for example, when a control request trigger for the hot-water usage apparatus 3a which can communicate with the information panel 1 is generated. Specifically, for example, when a control request trigger for turning on the floor heater 34 which is connected to the heat source equipment 32 is generated, the trigger generation section 22 issues the control request signal 65 and stores its contents in the buffer 23. At this time, between the server 2 and the information panel 1, a session is established by the periodic UDP 63 which is issued from the information panel 1. Then, the transmission and reception section 21 of the server 2 promptly transmits the request response UDP 66 to the IP address of the information panel 1 at the point of time, or the transmission-origin address of the periodic UDP 63.

The first transmission and reception section 11 of the information panel 1 receives the request response UDP 66 which has been transmitted by the transmission and reception section 21 of the server 2. Then, it transmits the confirmation UDP 67 to the transmission and reception section 21 of the server 2. The transmission and reception section 21 of the server 2 receives the confirmation UDP 67 which is transmitted by the first transmission and reception section 11 of the information panel 1. The information panel 1 which has received the request response UDP 66 transfers a control processing signal 68 from the second transmission and reception section 12 to the transmission and reception section 31 of the hot-water usage apparatus 3a, so that the hot-water usage apparatus 3a can be controlled as prescribed. Herein, the prescribed control means, for example, various kinds of control such as default control and timer control which the hot-water usage apparatus 3a has, various types of setting such as a timer setting, or the like. In other words, if the control request which has been generated in the trigger generation section 22 is a request to start hot-water supply to a bath, the transmission and reception section 21 of the server 2 transmits the request response UDP 66 to the first transmission and reception section 11 of the information panel 1. The first transmission and reception section 11 of the information panel 1 receives the request response UDP 66 which has been transmitted by the transmission and reception section 21 of the server 2. The second transmission and reception section 12 of the information panel 1 transmits, to the hot-water usage apparatus 3a, the control processing signal 68 for starting the hot-water supply to the bath. The transmission and reception section 31 of the hot-water usage apparatus 3a receives the control processing signal 68 which has been transmitted by the second transmission and reception section 12 of the information panel 1.

Through the above described series of information transfers, the hot-water usage apparatus 3a starts to supply hot water to the bath. Besides, the transmission and reception section 31 of the hot-water usage apparatus 3a transmits, to the second transmission and reception section 12 of the information panel 1, the state change information 69 relates to a change in the state of the hot-water usage apparatus 3a. It includes, for example, starting to supply hot water to the bath, finishing the hot-water supply after a predetermined time elapses and the volume of hot water supplied to the bath reaches a proper quantity, or the like. The second transmission and reception section 12 of the information panel 1 receives the state change information 69 from the hot-water usage apparatus 3a. The first transmission and reception section 11 of the information panel 1 transmits the result TCP 70 to the transmission and reception section 21 of the server 2. The transmission and reception section 21 of the server 2 receives the result TCP 70 which has been transmitted by the first transmission and reception section 11 of the information panel 1, so that the series of pieces of information transfer processing is completed.

Herein, the hot-water usage apparatus 3a is not necessarily controlled by communicating with the information panel 1. Needless to say, it may also be directly connected to a terminal of the information panel 1 or the like, so that it can be controlled. Besides, the request response UDP 66 may also be a signal of a TCP protocol. In that case, there is no need for the confirmation UDP 67 with respect to the request response UDP 66. Thereby, using a signal based on a TCP protocol, a request response information can be certainly transmitted.

Moreover, needless to say, the state change information 69 and the result TCP 70 may also be sent out, not only when a change is made in the state of the hot-water usage apparatus 3a, the information panel 1, or the like, but also when the state at a fixed point of time of the hot-water usage apparatus 3a, the information panel 1 or the like is transferred at regular intervals.

Furthermore, in this embodiment, an example is described in which the electrical equipment 3 is applied to the hot-water usage apparatus 3a. However, the present invention is not limited only to this. The electrical equipment 3 may also be applied to a security apparatus in which various sensors, such as an opening-and-shutting sensor, a human-presence sensor, a fire sensor and a gas-leakage sensor, keep a watch, and the sensors operate to issue a voice or a report, or to allow a security guard to rush to a house. Besides, the electrical equipment 3 may also be an air conditioner, a washing machine, heating cooking equipment such as a microwave oven, a rice cooker and an IH cooker, or a freezing refrigeration apparatus such as a refrigerator, a freezer, a freezing refrigerator.

Figure 4:
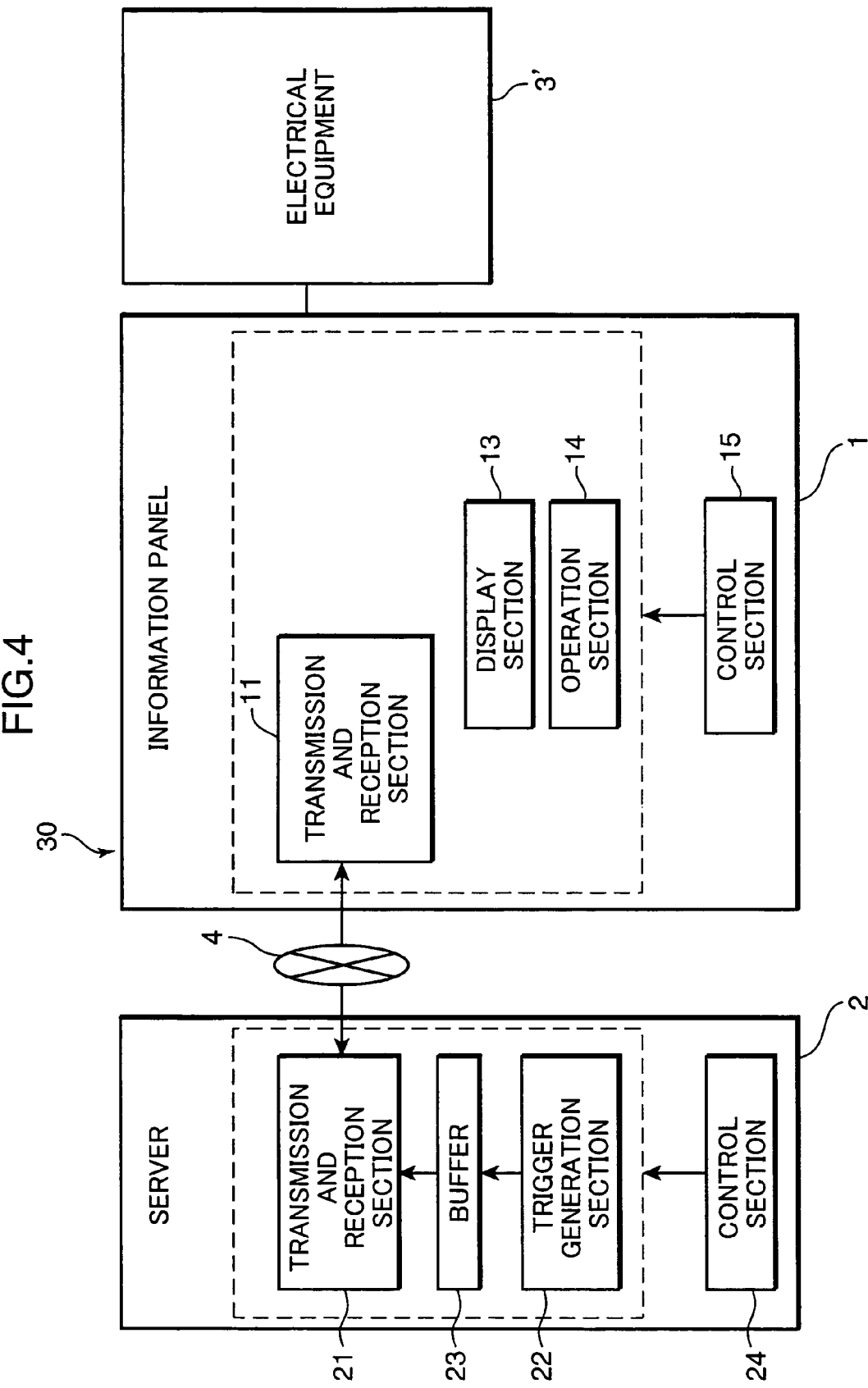
FIG. 4 is a block diagram, showing the whole configuration of an information transfer system according to a variation of the first embodiment.

Next, description is given of an information transfer system according to a variation of the first embodiment of the present invention. FIG. 4 is a block diagram, showing the whole configuration of the information transfer system according to the variation of the first embodiment. The component elements which have the same reference numerals as those of the information transfer system 10 according to the first embodiment shown in FIG. 1, have the identical functions. An information transfer system 30 shown in FIG. 4 is configured by the information panel 1, the server 2, and electrical equipment 3'. Herein, as the electrical equipment 3', various kinds of equipment can be used in the same way as the electrical equipment 3 according to the first embodiment. The electrical equipment 3' is directly connected to a terminal of the information panel 1, so that it can be controlled by the information panel 1. Therefore, the information panel 1 is different from that of the information transfer system 10 shown in FIG. 1. It is made up only of a transmission and reception section 11, the display section 13, the operation section 14, and the control section 15.

Herein, the information panel 1 according to this embodiment is a controller which controls the electrical equipment 3'. However, the present invention is not limited only to this. It may also be, for example, a remote controller, a personal computer, a television, or the like. In addition, the information panel 1 may also control a plurality of pieces of electrical equipment, not a single piece of electrical equipment. Furthermore, in this embodiment, the server 2 may also be information equipment, such as a personal computer, a portable terminal and a mobile phone.

Figure 5:
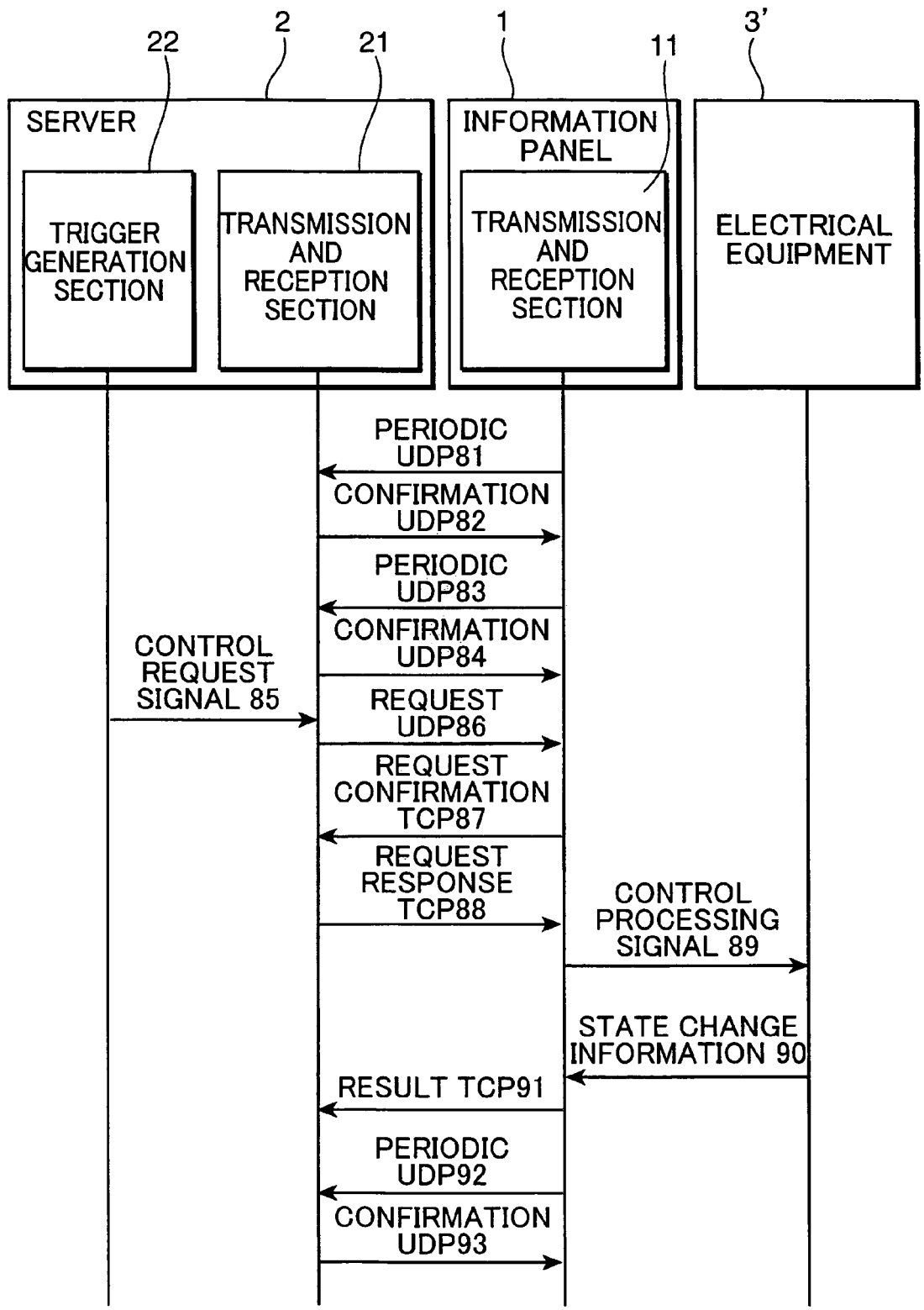
FIG. 5 is a diagram, showing an information transfer procedure of the information transfer system according to the variation of the first embodiment shown in FIG. 4.

FIG. 5 is a diagram, showing an information transfer procedure of the information transfer system 30 according to the variation of the first embodiment shown in FIG. 4. FIG. 5 shows the exchange of information by the transmission and reception section 11 of the information panel 1, the transmission and reception section 21 of the server 2, the electrical equipment 3' and the trigger generation section 22 of the server 2. Reference numerals 81 to 93 designate the contents of each piece of information. Herein, in FIG. 5, periodic UDPs 81, 83, 92 represent IP address information which the information panel 1 transmits periodically based on a UDP protocol. Confirmation UDPs 82, 84, 93 represent confirmation information which the server 2 issues, for the periodic UDPs 81, 83, 92 from the information panel 1, based on the UDP protocol. A request UDP 86 indicates request information which the server 2 issues based on the UDP protocol. A request confirmation TCP 87 indicates request confirmation information which the information panel 1 issues, for the request UDP 86 from the server 2, based on the TCP protocol. A request response TCP 88 indicates request response information which the server 2 issues, for the request confirmation TCP 87 from the information panel 1, based on the TCP protocol. A result TCP 91 indicates result information which the information panel 1 issues based on the TCP protocol. For example, the result TCP 91 is state-change data on the electrical equipment 3', a response result to a control request, or the like. For example, if the electrical equipment 3' is a gas hot-water supplier, then using the result TCP 91, information on the gas hot-water supplier is transferred through the information panel 1 to the server 2. Such information includes, as a control instruction for the gas hot-water supplier, starting to supply hot water to a bath or finishing hot-water supply after a predetermined time elapses and the volume of hot water supplied into a bathtub reaches a proper quantity. Of course, the electrical equipment 3' may also be equipment except a gas hot-water supplier, and needless to say, a control request can also be other than starting to supply hot water to a bath.

Herein, in this embodiment, a UDP protocol is used as the connectionless-type protocol, and a TCP protocol is used as the connection-type protocol. However, the present invention is not limited only to this. Connectionless-type protocols other than a UDP protocol may also be used, and connection-type protocols other than a TCP protocol may also be used.

Next, the operation of the information transfer system 30 shown in FIG. 4 will be described using the information transfer procedure shown in FIG. 5. In this embodiment, the information panel 1 is connected to the network (or the Internet) 4. An IP address which the information panel 1 has is not connected to the network 4 through a global address that is constantly fixed, but connected to the network 4 through an IP address that is sequentially switched by a provider or the like. Therefore, the IP address of the information panel 1 is not a fixed address, and thus, the server 2 cannot become constantly aware of the IP address of the information panel 1. Hence, when a trigger is generated in the trigger generation section 22 of the server 2, the information panel 1 transmits IP address information periodically so as to inform the server 2 of the IP address of the information panel 1 at the point of time. This is the periodic UDPs 81, 83, 92 shown in FIG. 5. In this way, the information panel 1 transmits the IP address information periodically to the server 2, so that the server 2 can certainly transfer the information to the information panel 1. Thus, it can certainly control the information panel 1 and can certainly monitor the state of the information panel 1.

Herein, the interval of time from the transmission of the periodic UDP 81 to the transmission of the periodic UDP 83 by the first transmission and reception section 11 of the information panel 1 is preset, for example, at two minutes. Besides, there is a case where if a certain time passes, the session of the information panel 1 and the server 2 is automatically opened. In this case, the transmission and reception section 11 of the information panel 1 may also transmit a periodic UDP by detecting the session being opened.

In addition, the transmission and reception section 11 of the information panel 1 may also learn the time from the establishment of a session of the information panel 1 and the server 2 to the opening of the session. In that case, the interval of time at which a periodic UDP is transmitted can be set according to the learned time. Specifically, the transmission and reception section 11 of the information panel 1 lengthens, little by little, the interval of time at which a periodic UDP is transmitted after the previous periodic UDP has been transmitted. If it cannot receive a confirmation UDP, it shortens the time interval from the transmission of a periodic UDP to the transmission of the following periodic UDP.

In this way, the period of time is learned from the establishment of a session of the information panel 1 and the server 2 to the opening of the session. Then, according to the learned time, the time interval is set from the transmission of information based on a connectionless-type protocol to the transmission of information based on the next connectionless-type protocol. Therefore, the session of the information panel 1 and the server 2 can always be kept established, thus avoiding a state where the session stays opened. This is especially effective in a case where the session is automatically opened.

For example, when a control request trigger for the electrical equipment 3' which can communicate with the information panel 1 is generated in the trigger generation section 22 of the server 2, the trigger generation section 22 issues a control request signal 85 and stores its contents in the buffer 23. At this time, between the server 2 and the information panel 1, a session is established by the periodic UDP 83 which is issued from the information panel 1. Then, the transmission and reception section 21 of the server 2 promptly transmits the request UDP 86 to the IP address of the information panel 1 at the point of time, or the transmission-origin address of the periodic UDP 83.

Herein, for example, if the periodic UDP 83 is a signal based on a TCP protocol, then at the point of time when the communication of the periodic signal of the TCP protocol is completed, a series of pieces of processing is executed such as returning an ACK signal from the server 2 to the information panel 1. Thereafter, the session of the server 2 and the information panel 1 is opened. Therefore, at the point of time when the session has been opened, the server 2 cannot become aware of the IP address of the information panel 1. This makes it impossible for the transmission and reception section 21 of the server 2 to transmit the request UDP 86 instantly when the control request signal 85 has been generated.

On the other hand, in this embodiment, the periodic UDP 83 is a signal based on a UDP protocol, and thus, the session is not necessarily opened at the point of time when the communication is completed. Therefore, when the control request signal 85 is produced, the server 2 is aware of the IP address of the information panel 1 at the point of time. Hence, the transmission and reception section 21 of the server 2 can transmit the request UDP 86 immediately to the information panel 1. The transmission and reception section 11 of the information panel 1 which has received the request UDP 86 transmits the request confirmation TCP 87 to the server 2. The transmission and reception section 21 of the server 2 receives the request confirmation TCP 87 which has been transmitted by the transmission and reception section 11 of the information panel 1. Then, it transmits the request response TCP 88 to the transmission and reception section 11 of the information panel 1.

Herein, the server 2 receives the control request signal 85 and does not instantly send out the request response TCP 88. It transmits the request UDP 86 and sends out the request response TCP 88 after receiving the request confirmation TCP 87. This is because much of the information of the information panel 1 which is inside the server 2 in the stage where the control request signal 85 has been generated, or the information except the IP address information of the information panel 1 at the point of time when a transfer has been executed through the periodic UDP 83, has some doubt as to its immediacy. For example, even if the periodic UDP 83 includes the state information on the electrical equipment 3' or the information panel 1 itself, before the control request signal 85 is generated, a change in the state of the electrical equipment 3' may be taking place, such as whether it has been turned on or off, or whether it is now supplying hot water or it has finished supplying hot water. Hence, it is not necessarily correct. Therefore, in the case where the electrical equipment 3' or the information panel 1 itself is controlled, or in the case where information is transferred, control needs to be executed by accurately recognizing the state information such as the on-and-off state, temperature-setting state and timer-setting state of the electrical equipment 3' at the point of time when the control request signal 85 has been generated. Besides, in the case where a measure to lessen the information of a periodic UDP to the utmost or the like is taken so that traffic on the Internet 4 can be lightened, the information which is transferred by the periodic UDP 83 is reduced. Thus, in order to become aware of the information at the point of time when the control request signal 85 has been generated, the information has to be confirmed over again. Hence, a procedure is executed in which the request UDP 86 is first sent out to the information panel 1, then the request confirmation TCP 87 including various kinds of information is sent out from the information panel 1, and after this, the server 2 sends out the request response TCP 88 to the information panel 1.

The information panel 1 which has received the request response TCP 88 outputs a control processing signal 89 to the electrical equipment 3', so that the electrical equipment 3' can be controlled as prescribed. Herein, the prescribed control means, for example, various kinds of control such as default control and timer control which the electrical equipment 3' has, various types of setting such as timer setting, or the like. When the state of the electrical equipment 3' changes according to the result of control by the control processing signal 89 or the like, state change information 90 is outputted from the electrical equipment 3' to the information panel 1. Then, the result is transferred as the result TCP 91 to the server 2, and the series of information transfers is completed. Herein, the state of the electrical equipment 3' indicates an electrically-detectable state of the electrical equipment 3'.

Herein, for example, let's assume the electrical equipment 3' which can communicate with the information panel 1 to be a gas hot-water supplier. If a control request for the gas hot-water supplier which is generated in the trigger generation section 22 of the server 2 is a request to start hot-water supply to a bath, the transmission and reception section 21 of the server 2 transmits the request UDP 86 to start the hot-water supply to the bath to the transmission and reception section 11 of the information panel 1. The transmission and reception section 11 of the information panel 1 receives the request UDP 86 which has been transmitted by the transmission and reception section 21 of the server 2. Then, it transmits the request confirmation TCP 87 to the transmission and reception section 21 of the server 2. The transmission and reception section 21 of the server 2 receives the request confirmation TCP 87 which has been transmitted by the transmission and reception section 11 of the information panel 1, and transmits the request response TCP 88. The transmission and reception section 11 of the information panel 1 receives the request response TCP 88 which has been transmitted by the transmission and reception section 21 of the server 2. Then, it outputs, to the gas hot-water supplier, the control processing signal 89 for starting the hot-water supply to the bath.

Through the above described series of information transfers, the gas hot-water supplier starts to supply hot water to the bath. Besides, the gas hot-water supplier outputs, to the information panel 1, the state change information 90 on a change in the state of the gas hot-water supplier. It includes, for example, starting to supply hot water to the bath, finishing the hot-water supply after a predetermined time elapses and the volume of hot water supplied to the bath reaches a proper quantity, or the like. Then, the state change information 90 from the gas hot-water supplier is inputted in the information panel 1. The transmission and reception section 11 of the information panel 1 transmits the result TCP 91 to the transmission and reception section 21 of the server 2. The transmission and reception section 21 of the server 2 receives the result TCP 91 which has been transmitted by the transmission and reception section 11 of the information panel 1, so that the series of pieces of information transfer processing is completed. Naturally, the electrical equipment 3' may also be equipment except a gas hot-water supplier, and the information network 4 may also be except for the Internet. Needless to say, a control request can also be other than starting to supply hot water to a bath. Besides, it is natural that the information panel 1 continues to send out a periodic UDP like the periodic UDP 92, even after the series of information transfers is completed.

Herein, a periodic UDP does not necessarily continue to be sent out at a fixed interval, as long as it is sent out substantially at a certain interval. In addition, for a signal based on a UDP protocol, an ACK signal is not returned when it is transferred. Hence, it becomes less reliable than a signal based on a TCP protocol. Therefore, if the transmission and reception section 21 of the server 2 receives the periodic UDPs 81, 83, 92, it transmits the confirmation UDPs 82, 84, 93 to the transmission and reception section 11 of the information panel 1. In this way, for the periodic UDPs 81, 83, 92, the confirmation UDPs 82, 84, 93 are sent out from the server 2 to the information panel 1, so that the information transfer becomes more reliable.

Furthermore, the information panel 1 includes the display section 13 or the operation section 14. Thereby, in the information panel 1, information can be confirmed, such as the state of the electrical equipment 3' and the confirmation of the communication state with the server 2. This presents an extremely great advantage, such as setting the contents of information sending. Herein, the electrical equipment 3' is connected to a terminal of the information panel 1. However, it may also be controlled by communicating with the information panel 1.

Moreover, in this embodiment, description is given about the transfer of information for controlling the electrical equipment 3'. Needless to say, in the same was as described above, the present invention can be applied to the control of the information panel 1 itself, or the transfer of information like life information, such as a weather forecast, a timetable, the present time, a gas consumption, a power consumption, a water consumption, a gas rate, a power rate and a water rate, or the like. Furthermore, the electrical equipment 3' according to this embodiment may also be various meters, such as a gas meter, an electric-power meter and a water meter. If the electrical equipment 3' is various meters such as a gas meter, an electric-power meter and a water meter, the information transfer system may also be applied to an information transfer for executing control such as the remote cutoff and remote return (opening) of a meter. Moreover, needless to say, the state change information 90 and the result TCP 91 may also be sent out, not only when a change is made in the state of the electrical equipment 3', the information panel 1, or the like, but also when the state at a fixed point of time of the electrical equipment 3', the information panel 1 or the like is transferred at regular intervals.

Hence, before a communication request is generated in the trigger generation section 22, the transmission and reception section 21 of the server 2 receives information (or a periodic UDP) based on a connectionless-type protocol which is periodically transmitted from the information panel 1. Thereby, the session remains connected between it and the first transmission and reception section 11 of the information panel 1. Therefore, the transmission and reception section 21 can issue, to the transmission-origin address of the periodic UDP, request information (or a request UDP) based on a connectionless-type protocol, instantly without waiting for the following periodic UDP. Thus, the information transfer can be executed without a time lag from the communication-request generation in the trigger generation section 22 to the transmission of the request UDP. In addition, the request UDP aims at transferring, to the information panel 1, the fact that the communication request has been generated in the trigger generation section 22. Hence, it includes a smaller amount of information than the request response information (or the request response UDP) based on a connectionless-type protocol which has detailed information such as the contents of communication. This helps reduce the amount of communication data on a network.

In addition, when information (or a periodic UDP) based on a connectionless-type protocol which is periodically transmitted from the first transmission and reception section 11 of the information panel 1 has been received by the transmission and reception section 21 of the server 2, confirmation information (or a confirmation UDP) based on a connectionless-type protocol or confirmation information (or a confirmation TCP) based on a connection-type protocol is transmitted to the transmission-origin address of the periodic UDP. This makes it possible to execute a transfer confirmation of the periodic UDP of which a communication transfer confirmation is not made as a basic protocol.

Furthermore, when request information (or a request UDP) based on a connectionless-type protocol which is transmitted from the transmission and reception section 21 of the server 2 has been received by the first transmission and reception section 11 of the information panel 1, confirmation information (or a confirmation UDP) based on a connectionless-type protocol or confirmation information (or a confirmation TCP) based on a connection-type protocol is transmitted for the request information. This makes it possible to execute a transfer confirmation of the request UDP of which a communication transfer confirmation is not made as a basic protocol.

Moreover, when request response information based on a connection-type protocol or request response information based on a connectionless-type protocol has been received, the electrical equipment which is connected to the electrical-equipment communication apparatus (or the information panel 1) can be controlled. Besides, the server 2 can receive change state data on the information panel 1 or the electrical equipment 3' connected to the information panel 1, so that it can recognize the state of the information panel 1 or the electrical equipment 3' which has been changed through the control.

Figure 6:
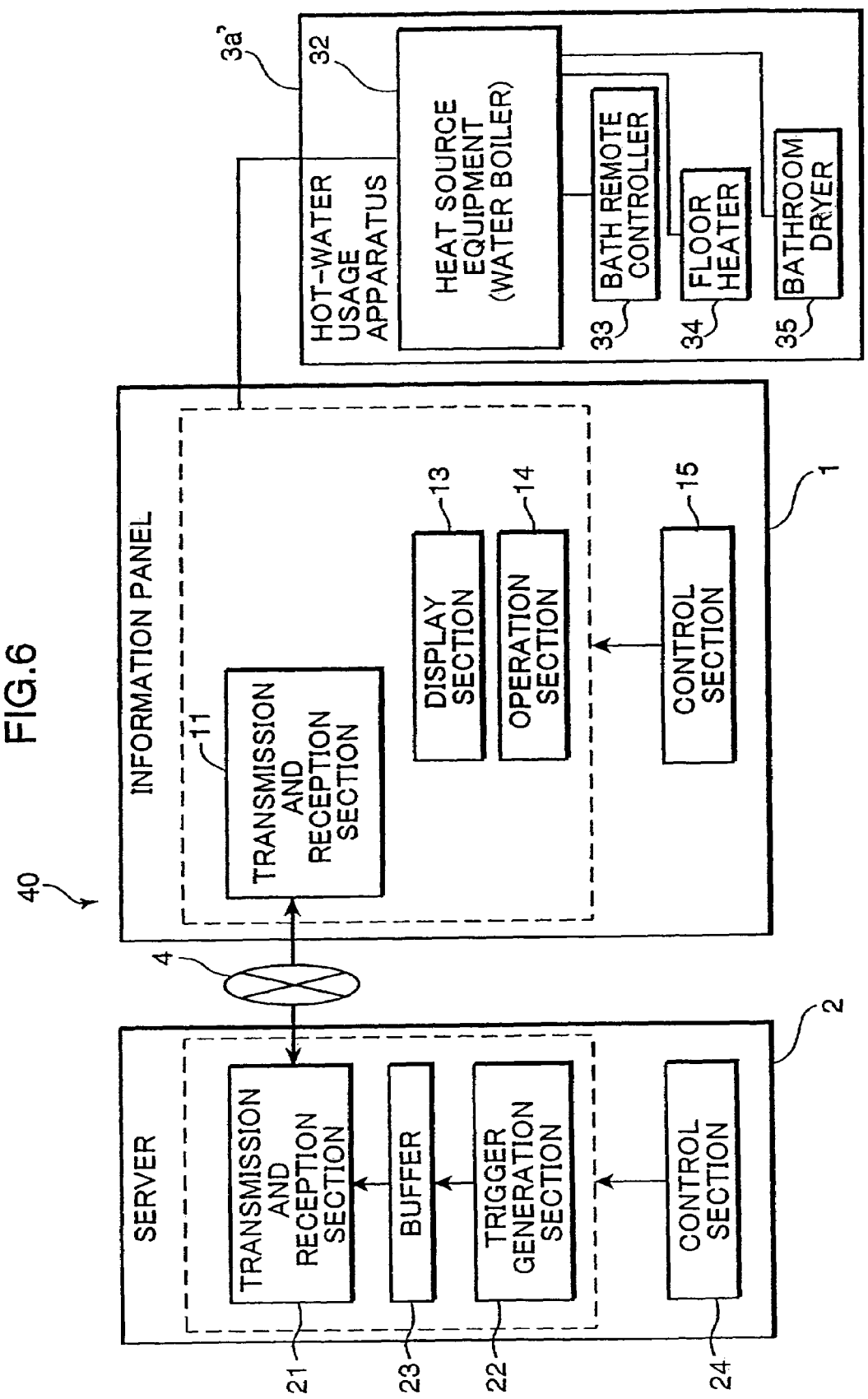
FIG. 6 is a block diagram, more specifically showing an information transfer according to the variation of the first embodiment.

Herein, the information transfer according to the variation of the first embodiment will be more specifically described. FIG. 6 is a block diagram, more specifically showing the information transfer according to the variation of the first embodiment. Herein, in the following description, an example is described in which the electrical equipment is applied as a hot-water usage apparatus. The hot-water usage apparatus is an apparatus which creates hot water using an energy source such as gas, electric power and oil, and supplies the hot water which is used directly in a bath, a kitchen, a washroom or the like. In addition, it is an apparatus which has the function of, using the hot water it creates, floor heating, bathroom heating, bathroom drying, heating by a fan heater or an air conditioner, or the like.

An information transfer system 40 shown in FIG. 6 is configured by the information panel 1, the server 2 and a hot-water usage apparatus 3a'. Herein, the configuration of the information panel 1 and the server 2 in the information transfer system 40 shown in FIG. 6 is the same as the configuration of the information panel 1 and the server 2 in the information transfer system 30 shown in FIG. 4. Hence, it is given the same reference numerals, and thus, its detailed description is omitted. Therefore, in the following description, only the configurations are given which are different from those of the information transfer system 30 shown in FIG. 4.

The information panel 1 is communicably connected to the server 2, via an information network 4 (hereinafter, referred to as the network 4). It is, for example, a controller which controls the hot-water usage apparatus 3a'. The information panel 1 is made up of a transmission and reception section 11, a display section 13, an operation section 14, and a control section 15. Herein, the information panel 1 according to this embodiment is a controller which controls the hot-water usage apparatus 3a'. However, the present invention is not limited only to this. It may also be, for example, a remote controller, a personal computer, a television, or the like. In addition, the information panel 1 may also control not only the hot-water usage apparatus 3a' but also another piece of electrical equipment.

The server 2 is communicably connected via the network 4 to the information panel 1. It is made up of the transmission and reception section 21, a trigger generation section 22, a buffer 23, and a control section 24. Herein, in this embodiment, the server 2 may also be information equipment, such as a personal computer, a portable terminal and a mobile phone.

The hot-water usage apparatus 3a' is formed by a heat source equipment 32, a bath remote controller 33, a floor heater 34, and a bathroom dryer 35. The heat source equipment 32 creates and supplies hot water, using gas, electricity or oil as an energy source. It is a so-called water boiler. The heat source equipment 32 has a hot-water supplying function of supplying the hot water it creates to a bath, a kitchen, a washroom, or the like. It also has a heating function of using the hot water it creates as a heat source of floor heating, a bathroom heater, a bathroom dryer, a fan heater, an air conditioner, or the like. The bath remote controller 33 controls a hot-water supply or the like and is mainly installed in a bath. The floor heater 34 warms a floor, using the hot water which is created by the heat source equipment 32. The bathroom dryer 35 dries a bathroom, using the hot water which is created by the heat source equipment 32. Herein, the floor heater 34 and the bathroom dryer 35 may also be equipment which uses the hot water of a bathroom heater, a fan heater, an air conditioner, or the like.

Next, the operation of the information transfer system 20 shown in FIG. 6 will be described. Herein, the following description is given with reference to the information transfer procedure shown in FIG. 5.

The transmission and reception section 11 of the information panel 1 periodically transmits, to the server 2, IP address information (or a periodic UDP) based on a UDP protocol. The transmission and reception section 21 of the server 2 receives the periodic UDP which is transmitted by the transmission and reception section 11 of the information panel 1. Then, it transmits confirmation information (or a confirmation UDP) based on a UDP protocol to the transmission and reception section 11 of the information panel 1. The transmission and reception section 11 of the information panel 1 receives the confirmation UDP which is transmitted by the transmission and reception section 21 of the server 2.

Herein, in the trigger generation section 22 of the server 2, for example, when a control request trigger for the hot-water usage apparatus 3a' which can communicate with the information panel 1 is generated, specifically, for example, when a control request trigger for turning on the floor heater 34, which is connected to the heat source equipment 32, is generated, the trigger generation section 22 issues the control request signal 85 and stores its contents in the buffer 23. At this time, between the server 2 and the information panel 1, a session is established by the periodic UDP 83 which is issued from the information panel 1. Then, the transmission and reception section 21 of the server 2 promptly transmits the request UDP 86 to the IP address of the information panel 1 at the point of time, or the transmission-origin address of the periodic UDP 83.

The transmission and reception section 11 of the information panel 1 receives the request UDP 86 which has been transmitted by the transmission and reception section 21 of the server 2. Then, it transmits the request confirmation TCP 87 to the transmission and reception section 21 of the server 2. The transmission and reception section 21 of the server 2 receives the request confirmation TCP 87 which is transmitted by the transmission and reception section 11 of the information panel 1. Then, it transmits the request response TCP 88 for the request confirmation TCP 87 to the transmission and reception section 11 of the information panel 1. The information panel 1 which has received the request response TCP 88 outputs a control processing signal 89 to the heat source equipment 32 of the hot-water usage apparatus 3a', so that the hot-water usage apparatus 3a' can be controlled as prescribed. Herein, the prescribed control means, for example, various kinds of control such as default control and timer control which the hot-water usage apparatus 3a' has, various types of setting such as timer setting, or the like. In other words, if the control request, which has been generated in the trigger generation section 22, is a request to start hot-water supply to a bath, the transmission and reception section 21 of the server 2 transmits the request response TCP 88 to the transmission and reception section 11 of the information panel 1. The transmission and reception section 11 of the information panel 1 receives the request response TCP 88 which has been transmitted by the transmission and reception section 21 of the server 2. The information panel 1 outputs, to the heat source equipment 32 of the hot-water usage apparatus 3a', the control processing signal 89 for starting the hot-water supply to the bath. The control processing signal 89 which has been transmitted by the information panel 1 is inputted in the heat source equipment 32 of the hot-water usage apparatus 3a'.

Through the above described series of information transfers, the hot-water usage apparatus 3a' starts to supply hot water to the bath. Besides, the heat source equipment 32 of the hot-water usage apparatus 3a' outputs, to the information panel 1, the state change information 90 on a change in the state of the hot-water usage apparatus 3a'. It includes, for example, starting to supply hot water to the bath, finishing the hot-water supply after a predetermined time elapses and the volume of hot water supplied to the bath reaches a proper quantity, or the like. The state change information 90 from the hot-water usage apparatus 3a' is inputted in the information panel 1. The transmission and reception section 11 of the information panel 1 transmits the result TCP 91 to the transmission and reception section 21 of the server 2. The transmission and reception section 21 of the server 2 receives the result TCP 91 which has been transmitted by the transmission and reception section 11 of the information panel 1, so that the series of pieces of information transfer processing is completed.

Moreover, needless to say, the state change information 90 and the result TCP 91 may also be sent out, not only when a change is made in the state of the hot-water usage apparatus 3a', the information panel 1, or the like, but also when the state at a fixed point of time of the hot-water usage apparatus 3a', the information panel 1 or the like is transferred at regular intervals.

Furthermore, in this embodiment, an example is described in which the electrical equipment 3 is applied to the hot-water usage apparatus 3a, 3a'. However, the present invention is not limited only to this. The electrical equipment 3 may also be applied to a security apparatus in which various sensors, such as an opening-and-shutting sensor, a human-presence sensor, a fire sensor and a gas-leakage sensor, keep a watch, and the sensors operate to issue a voice or a report, or to allow a security guard to rush to a house. Besides, the electrical equipment 3 may also be an air conditioner, a washing machine, heating cooking equipment such as a microwave oven, a rice cooker and an IH cooker, or a freezing refrigeration apparatus such as a refrigerator, a freezer, a freezing refrigerator.

Furthermore, in this embodiment, description is given about the remote control of equipment. However, the present invention is not limited only to this. This art may also be used for a telemeter system which collects the state of equipment or a signal from a sensor.

In this embodiment, the first transmission and reception section 11 (or the transmission and reception section 11) of the information panel 1 may also detect the time from the establishment of a session to the opening of the session. In that case, if the detected time becomes shorter than a predetermined time, it notifies the information panel 1 or the server 2 that the time when the session is kept established has become shorter. Specifically, the first transmission and reception section 11 (or the transmission and reception section 11) of the information panel 1 lengthens, little by little, the interval of time at which a periodic UDP is transmitted after the previous periodic UDP has been transmitted. If it cannot receive a confirmation UDP, it shortens the time interval from the transmission of a periodic UDP to the transmission of the following periodic UDP. Then, if this time interval becomes shorter than a predetermined time, it notifies the information panel 1 or the server 2 that the time when the session is established has become shorter.

In this case, if the notification is given that the time when the session is established has become shorter, the first transmission and reception section 11 of the information panel 1 sets the time interval at which it transmits a periodic UDP, for example, to a predetermined time. Besides, if the notification is given that the time when the session is established has become shorter, the transmission and reception section 21 of the server 2 sets the time interval from the establishment to the opening of the session, for example, to a predetermined time. Herein, such a predetermined time is, for example, two minutes. In addition, in this embodiment, the information panel 1 decides that the time when the session is kept established has become shorter than a predetermined time. However, the present invention is not limited only to this. After the time when the session is established is transmitted to the server 2, the server 2 may also make a decision by comparing it with a predetermined time.

In this way, the first transmission and reception section 11 of the information panel 1 detects the time from the establishment of a session to the opening of the session. If the detected time becomes shorter than a predetermined time, the information panel 1 or the server 2 is notified that the time when the session is kept established has become shorter. Therefore, the amount of information which flows for a fixed time on a network can be reduced, thus preventing a delay or a loss of information.

Second Embodiment

Figure 7:
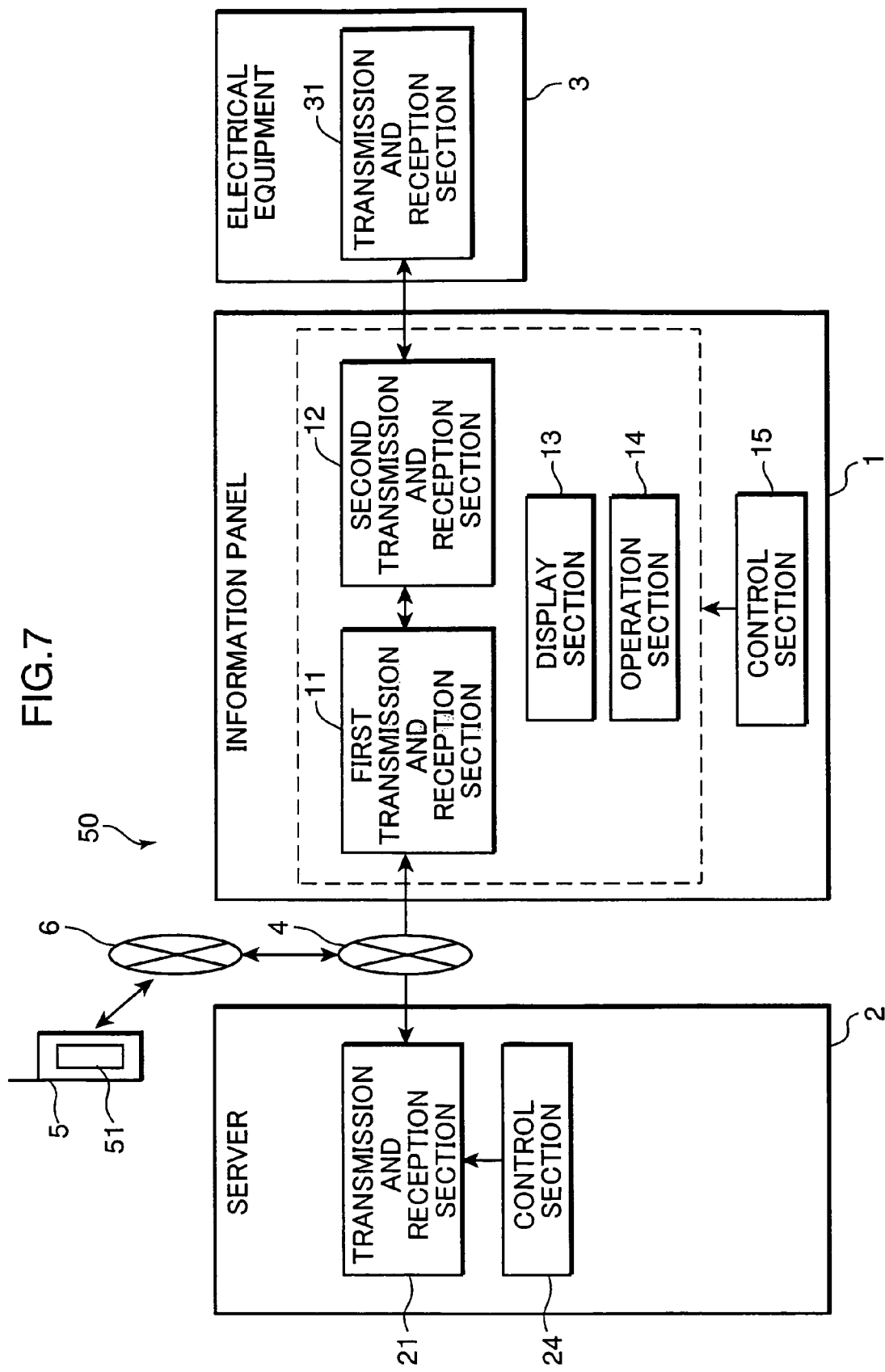
FIG. 7 is a block diagram, showing the whole configuration of an information transfer system according to a second embodiment of the present invention.

Next, a second embodiment of the present invention will be described. FIG. 7 is a block diagram, showing the entire configuration of an information transfer system according to the second embodiment. An information transfer system 50 shown in FIG. 7 is configured by an information panel 1, a server 2, electrical equipment (information communication apparatus) 3, and a cellular telephone 5. Herein, the configuration of the information panel 1, the server 2 and the electrical equipment 3 in the information transfer system 50 shown in FIG. 7 is the same as the configuration of the information panel 1, the server 2 and the electrical equipment 3 in the information transfer system 10 shown in FIG. 1. Hence, it is given the same reference numerals, and thus, its detailed description is omitted. Therefore, in the following description, only the configurations are given which are different from those of the information transfer system 10 shown in FIG. 1.

The information panel 1 is communicably connected to the server 2, via an information network 4 (hereinafter, referred to as the network 4). It is, for example, a controller which controls the electrical equipment 3. The information panel 1 is made up of a first transmission and reception section 11, a second transmission and reception section 12, a display section 13, an operation section 14, and a control section 15. Herein, the information panel 1 according to this embodiment is a controller which controls the electrical equipment 3. However, the present invention is not limited only to this. It may also be, for example, a remote controller, a personal computer, a television, or the like. In addition, the information panel 1 may also control a plurality of pieces of electrical equipment, not a single piece of electrical equipment.

The server 2 is communicably connected via the network 4 to the information panel 1 and is also communicably connected via a cell-phone network 6 and the network 4 to the cellular telephone 5. It is made up of the transmission and reception section 21 and a control section 24. The transmission and reception section 21 transmits information via the network 4 to the first transmission and reception section 11 of the information panel 1. It also receives information which is transmitted via the network 4 by the first transmission and reception section 11 of the information panel 1. In addition, the transmission and reception section 21 transmits information via the network 4 and the cell-phone network 6 to a transmission and reception section 51 of the cellular telephone 5. It also receives information which is transmitted via the cell-phone network 6 and the network 4 by the transmission and reception section 51 of the cellular telephone 5. The control section 24 controls the transmission and reception section 21. The electrical equipment 3 is communicably connected to the information panel 1 and is made up of the transmission and reception section 31. Herein, in this embodiment, the server 2 may also be information equipment, such as a personal computer, a portable terminal and a mobile phone.

The cellular telephone 5 is communicably connected via the cell-phone network 6 and the network 4 to the server 2 and is made up of the transmission and reception section 51. Herein, in this embodiment, the cellular telephone 5 is used, but the present invention is not limited only to this. Another information terminal may also be, such as a PHS (or personal handy phone system), a personal computer and a PDA (or personal digital assistant).

The transmission and reception section 51 transmits information via the cell-phone network 6 and the network 4 to the transmission and reception section 21 of the server 2. It also receives information which is transmitted via the cell-phone network 6 and the network 4 by the transmission and reception section 21 of the server 2.

Herein, in this embodiment, the transmission and reception section 21 of the server 2 is communicably connected via the cell-phone network 6 and the network 4 to the transmission and reception section 51 of the cellular telephone 5. However, the present invention is not limited only to this. The server 2 may also be provided separately with a transmission and reception section connected to the cell-phone network 6 and a transmission and reception section connected to the network 4. In addition, the cell-phone network 6 and the network 4 are usually connected to each other, via a gateway server or the like which transforms the format, address, protocol, or the like, of data in line with a network to which they are connected. However, it is omitted in the present invention. Besides, the transmission and reception section 21 of the server 2 may also be communicably connected via the cell-phone network 6 to the transmission and reception section 51 of the cellular telephone 5, and be communicably connected via the network 4 to the first transmission and reception section 11 of the information panel 1.

Herein, in this embodiment, the information panel 1 corresponds to an example of the electrical-equipment communication apparatus. The server 2 and the cellular telephone 5 correspond to an example of the information communication apparatus. The cellular telephone 5 corresponds to an example of the information terminal. The first transmission and reception section 11 and the second transmission and reception section 12 correspond to an example of the transmitting and receiving means of the electrical-equipment communication apparatus. The transmission and reception section 21 corresponds to an example of the transmitting and receiving means of the information communication apparatus. The transmission and reception section 51 corresponds to an example of the trigger generating means.

Figure 8:
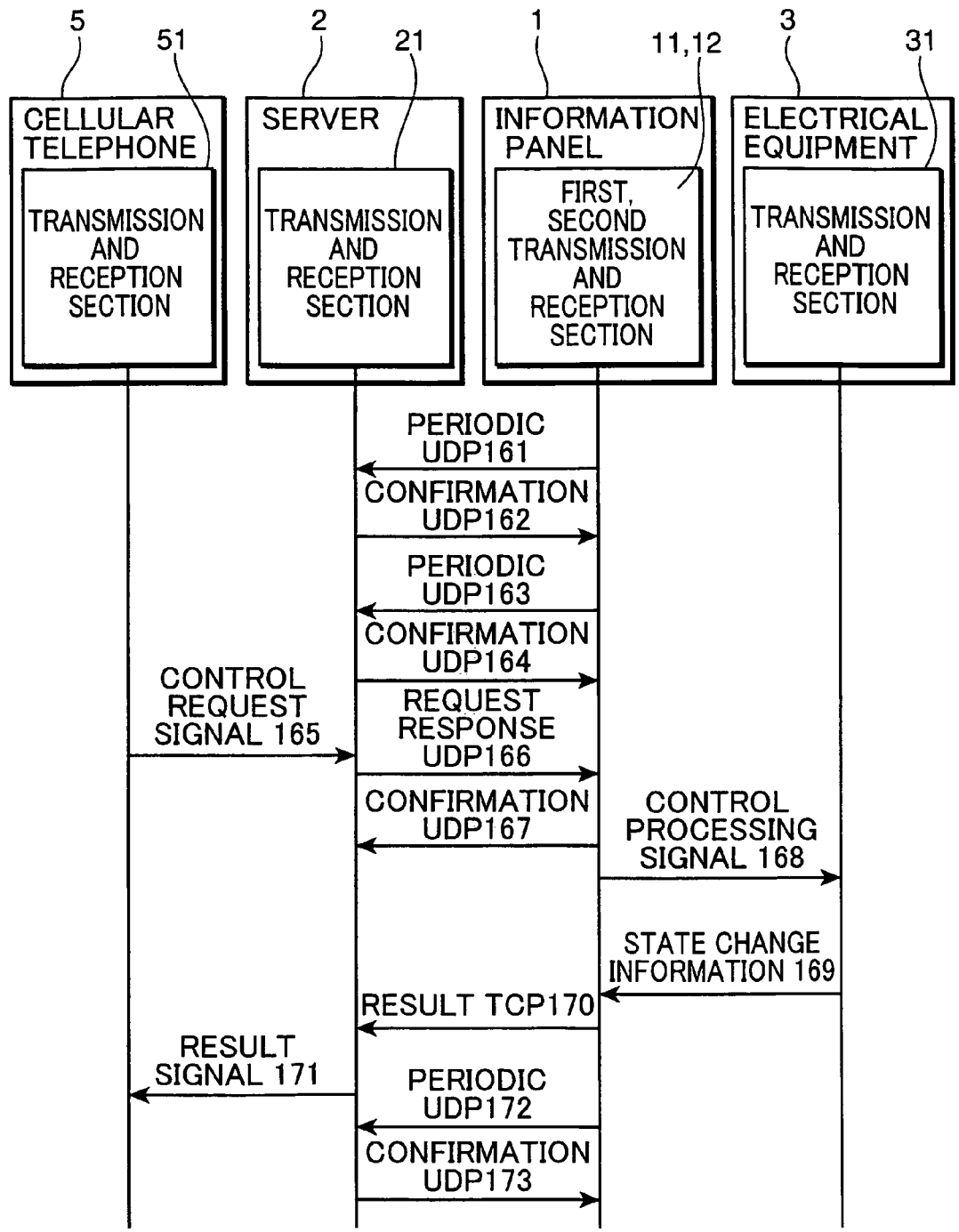
FIG. 8 is a diagram, showing an information transfer procedure of the information transfer system according to the second embodiment shown in FIG. 7.

FIG. 8 is a diagram, showing an information transfer procedure of the information transfer system according to the second embodiment shown in FIG. 7. FIG. 8 shows the exchange of information by the first transmission and reception section 11 and the second transmission and reception section 12 of the information panel 1, the transmission and reception section 21 of the server 2, the transmission and reception section 31 of the electrical equipment 3 and the transmission and reception section 51 of the cellular telephone 5. Reference numerals 161 to 173 designate the contents of each piece of information. Herein, in FIG. 8, periodic UDPs 161, 163, 172 represent IP address information which the information panel 1 transmits periodically based on a UDP protocol. Confirmation UDPs 162, 164, 173 represent confirmation information which the server 2 issues, for the periodic UDPs 161, 163, 172 from the information panel 1, based on the UDP protocol. A request response UDP 126 indicates request response information which the server 2 issues based on the UDP protocol. A confirmation UDP 167 indicates confirmation information which the information panel 1 issues, for a request response UDP 166 from the server 2, based on the UDP protocol. A result TCP 170 indicates result information which the information panel 1 issues based on a TCP protocol. For example, the result TCP 170 is state-change data on the electrical equipment 3, a response result to a control request, or the like. For example, if the electrical equipment 3 is a gas hot-water supplier, then using the result TCP 170, information on the gas hot-water supplier is transferred through the information panel 1 to the server 2. Such information includes, as a control instruction for the gas hot-water supplier, starting to supply hot water to a bath or finishing hot-water supply after a predetermined time elapses and the volume of hot water supplied into a bathtub reaches a proper quantity. Of course, the electrical equipment 3 may also be equipment except a gas hot-water supplier, and needless to say, a control request can also be other than starting to supply hot water to a bath.

Herein, in this embodiment, a UDP protocol is used as the connectionless-type protocol, and a TCP protocol is used as the connection-type protocol. However, the present invention is not limited only to this. Connectionless-type protocols other than a UDP protocol may also be used, and connection-type protocols other than a TCP protocol may also be used.

Next, the operation of the information transfer system 50 shown in FIG. 7 will be described using the information transfer procedure shown in FIG. 8. In this embodiment, the information panel 1 is connected to the network (or the Internet) 4. An IP address which the information panel 1 has is not connected to the network 4 through a global address that is constantly fixed, but connected to the network 4 through an IP address that is sequentially switched by a provider or the like. Therefore, the IP address of the information panel 1 is not a fixed address, and thus, the server 2 cannot become constantly aware of the IP address of the information panel 1. Hence, when a control request for the electrical equipment 3 reaches the server 2 via the cell-phone network 6 and the network 4 from the transmission and reception section 51 of the cellular telephone 5, the information panel 1 transmits IP address information periodically so as to inform the server 2 of the IP address of the information panel 1 at the point of time. This is the periodic UDPs 161, 163, 172 shown in FIG. 8. In this way, the information panel 1 transmits the IP address information periodically to the server 2, so that the server 2 can certainly transfer the information to the information panel 1. Thus, it can certainly control the information panel 1 and can certainly monitor the state of the information panel 1.

Herein, the interval of time from the transmission of the periodic UDP 161 to the transmission of the periodic UDP 163 by the first transmission and reception section 11 of the information panel 1 is preset, for example, at two minutes. Besides, there is a case where if a certain time passes, the session of the information panel 1 and the server 2 is automatically opened. In this case, the first transmission and reception section 11 of the information panel 1 may also transmit a periodic UDP by detecting the session being opened.

In addition, the first transmission and reception section 11 of the information panel 1 may also learn the time from the establishment of a session of the information panel 1 and the server 2 to the opening of the session. In that case, the interval of time at which a periodic UDP is transmitted can be set according to the learned time. Specifically, the first transmission and reception section 11 of the information panel 1 lengthens little by little the interval of time at which a periodic UDP is transmitted after the previous periodic UDP has been transmitted. If it cannot receive a confirmation UDP, it shortens the time interval from the transmission of a periodic UDP to the transmission of the following periodic UDP.

In this way, the period of time is learned from the establishment of a session of the information panel 1 and the server 2 to the opening of the session. Then, according to the learned time, the time interval is set from the transmission of information based on a connectionless-type protocol to the transmission of information based on the next connectionless-type protocol. Therefore, the session of the information panel 1 and the server 2 can always remain established, thus avoiding a state where the session stays opened. This is especially effective in a case where the session is automatically opened.

The transmission and reception section 51 of the cellular telephone 5 transmits a control request signal 165 to the transmission and reception section 21 of the server 2. The transmission and reception section 21 of the server 2 receives the control request signal 165 which has been transmitted by the cellular telephone 5. At this time, between the server 2 and the information panel 1, a session is established by the periodic UDP 163 which is issued from the information panel 1. Then, the transmission and reception section 21 of the server 2 promptly transmits the request response UDP 166 to the IP address of the information panel 1 at the point of time, or the transmission-origin address of the periodic UDP 163.

Herein, for example, if the periodic UDP 163 is a signal based on a TCP protocol, then at the point of time when the communication of the periodic signal of the TCP protocol is completed, a series of pieces of processing is executed such as returning an ACK signal from the server 2 to the information panel 1. Thereafter, the session of the server 2 and the information panel 1 is opened. Therefore, at the point of time when the session has been opened, the server 2 cannot become aware of the IP address of the information panel 1. This makes it impossible for the transmission and reception section 21 of the server 2 to transmit the request response UDP 166 instantly, even though it has received the control request signal 165.

On the other hand, in this embodiment, the periodic UDP 163 is a signal based on a UDP protocol, and thus, the session is not necessarily opened at the point of time when the communication is completed. Therefore, when it has received the control request signal 165, the server 2 is aware of the IP address of the information panel 1 at the point of time. Hence, the transmission and reception section 21 of the server 2 can transmit the request response UDP 166 immediately to the information panel 1. The information panel 1 which has received the request response UDP 166 transfers a control processing signal 168 from the second transmission and reception section 12 to the transmission and reception section 31 of the electrical equipment 3, so that the electrical equipment 3 can be controlled as prescribed. Herein, the prescribed control means, for example, various kinds of control such as default control and timer control which the electrical equipment 3 has, various types of setting such as timer setting, or the like. When the state of the electrical equipment 3 changes according to the result of control by the control processing signal 168 or the like, state change information 169 is transferred from the electrical equipment 3 to the information panel 1. Then, the result is transferred as the result TCP 170 to the server 2, and a result signal 171 which is state change information is transferred from the server 2 to the cellular telephone 5. Thus, the series of pieces of information transfer processing is completed. Herein, the state of the electrical equipment 3 indicates an electrically-detectable state of the electrical equipment 3.

Herein, for example, let's assume the electrical equipment 3 which can communicate with the information panel 1 to be a gas hot-water supplier. If a control request for the gas hot-water supplier which is generated in the cellular telephone 5 is a request to start hot-water supply to a bath, the transmission and reception section 51 of the cellular telephone 5 transmits the control request signal 165 to the transmission and reception section 21 of the server 2. The transmission and reception section 21 of the server 2 receives the control request signal 165 which has been transmitted by the transmission and reception section 51 of the cellular telephone 5. Then, it transmits the request response UDP 166 to start the hot-water supply to the bath to the first transmission and reception section 11 of the information panel 1. The first transmission and reception section 11 of the information panel 1 receives the request response UDP 166 from the server 2. The second transmission and reception section 12 of the information panel 1 transmits, to the gas hot-water supplier, the control processing signal 168 for starting the hot-water supply to the bath.

Through the above described series of information transfers, the gas hot-water supplier starts to supply hot water to the bath. Besides, the transmission and reception section 31 of the gas hot-water supplier transmits, to the second transmission and reception section 12 of the information panel 1, the state change information 169 on a change in the state of the gas hot-water supplier. It includes, for example, starting to supply hot water to the bath, finishing the hot-water supply after a predetermined time elapses and the volume of hot water supplied to the bath reaches a proper quantity, or the like. The second transmission and reception section 12 of the information panel 1 receives the state change information 169 from the gas hot-water supplier. The first transmission and reception section 11 of the information panel 1 transmits the result TCP 170 to the transmission and reception section 21 of the server 2. The transmission and reception section 21 of the server 2 receives the result TCP 170 which has been transmitted by the first transmission and reception section 11 of the information panel 1. The transmission and reception section 21 of the server 2 transmits the result signal 171 to the transmission and reception section 51 of the cellular telephone 5. The transmission and reception section 51 of the cellular telephone 5 receives the result signal 171 which has been transmitted by the transmission and reception section 21 of the server 2. Thus, the series of pieces of information transfer processing is completed. Naturally, the electrical equipment 3 may also be equipment except a gas hot-water supplier, and the information network 4 may also be except for the Internet. Needless to say, a control request can also be other than starting to supply hot water to a bath. Besides, it is natural that the information panel 1 continues to send out a periodic UDP like the periodic UDP 173, even after the series of information transfers is completed.

Herein, a periodic UDP not necessarily continues to be sent out at a fixed interval, as long as it is sent out substantially at a certain interval. In addition, for a signal based on a UDP protocol, an ACK signal is not returned when it is transferred. Hence, it becomes less reliable than a signal based on a TCP protocol. Therefore, if the transmission and reception section 21 of the server 2 receives the periodic UDPs 161, 163, 172, it transmits the confirmation UDPs 162, 164, 173 to the first transmission and reception section 11 of the information panel 1. In this way, for the periodic UDPs 161, 163, 172, the confirmation UDPs 162, 164, 173 are sent out from the server 2 to the information panel 1, so that the information transfer becomes more reliable. Moreover, in the same way, the confirmation UDP 167 is sent out for the request response UDP 166. Thereby, the above described disadvantages can be resolved, thus heightening the reliability of the information transfer.

Furthermore, the information panel 1 includes the display section 13 or the operation section 14. Thereby, in the information panel 1, information can be confirmed, such as the state of the electrical equipment 3 and the confirmation of the communication state with the server 2. This presents an extremely great advantage, such as setting the contents of information sending. Besides, if the cellular telephone 5 is provided with a display section, the display section provided in the cellular telephone 5 can display state change information which is included in the result signal 171 that has been received by the transmission and reception section 51. This makes it possible for a user to confirm the state of the electrical equipment 3 outdoors.

Herein, the electrical equipment 3 is not necessarily controlled by communicating with the information panel 1. Needless to say, it may also be directly connected to a terminal of the information panel 1 or the like, so that it can be controlled. Besides, the request response UDP 166 may also be a signal of a TCP protocol. In that case, there is no need for the confirmation UDP 167 with respect to the request response UDP 166. Thereby, using a signal based on a TCP protocol, a request response information can be certainly transmitted.

Moreover, in this embodiment, description is given about the transfer of information for controlling the electrical equipment 3. Needless to say, in the same way as described above, the present invention can be applied to the control of the information panel 1 itself, or the transfer of information like life information, such as a weather forecast, a timetable, the present time, a gas consumption, a power consumption, a water consumption, a gas rate, a power rate and a water rate, or the like. Furthermore, the electrical equipment 3 according to this embodiment may also be various meters, such as a gas meter, an electric-power meter and a water meter. If the electrical equipment 3 is various meters such as a gas meter, an electric-power meter and a water meter, the information transfer system may also be applied to an information transfer for executing control such as the remote cutoff and remote return (opening) of a meter. Moreover, needless to say, the state change information 169, the result TCP 170 and the result signal 171 may also be sent out, not only when a change is made in the state of the electrical equipment 3, the information panel 1, or the like, but also when the state at a fixed point of time of the electrical equipment 3, the information panel 1 or the like is transferred at regular intervals.

Hence, before a communication request is received which is transmitted from the transmission and reception section 51 of the cellular telephone 5, the transmission and reception section 21 of the server 2 receives information (or a periodic UDP) based on a connectionless-type protocol which is periodically transmitted from the information panel 1. Thereby, the session remains connected between it and the first transmission and reception section 11 of the information panel 1. Therefore, the transmission and reception section 21 can issue, to the transmission-origin address of the periodic UDP, request response information (or a request response UDP) based on a connectionless-type protocol or request response information (or a request response TCP) based on a connection-type protocol, instantly without waiting for the following periodic UDP. Thus, the information transfer can be executed without a time lag from the communication-request generation in the cellular telephone 5 to the transmission of the request response UDP or request response TCP. Therefore, the time interval can be shortened from the generation of a control request in the cellular telephone 5 to the transfer of information to the information panel 1. Thereby, information provision or control can be realized in real time.

In addition, result information based on a connection-type protocol is received by the transmission and reception section 21 of the server 2, and the received result information is transmitted as a result signal to the cellular telephone 5. Therefore, the state of the information panel 1 can be transferred to the server 2, using result information based on a connection-type protocol. In addition, the state of the information panel 1 can be transferred from the server 2 as a result signal to the cellular telephone 5.

Figure 9:
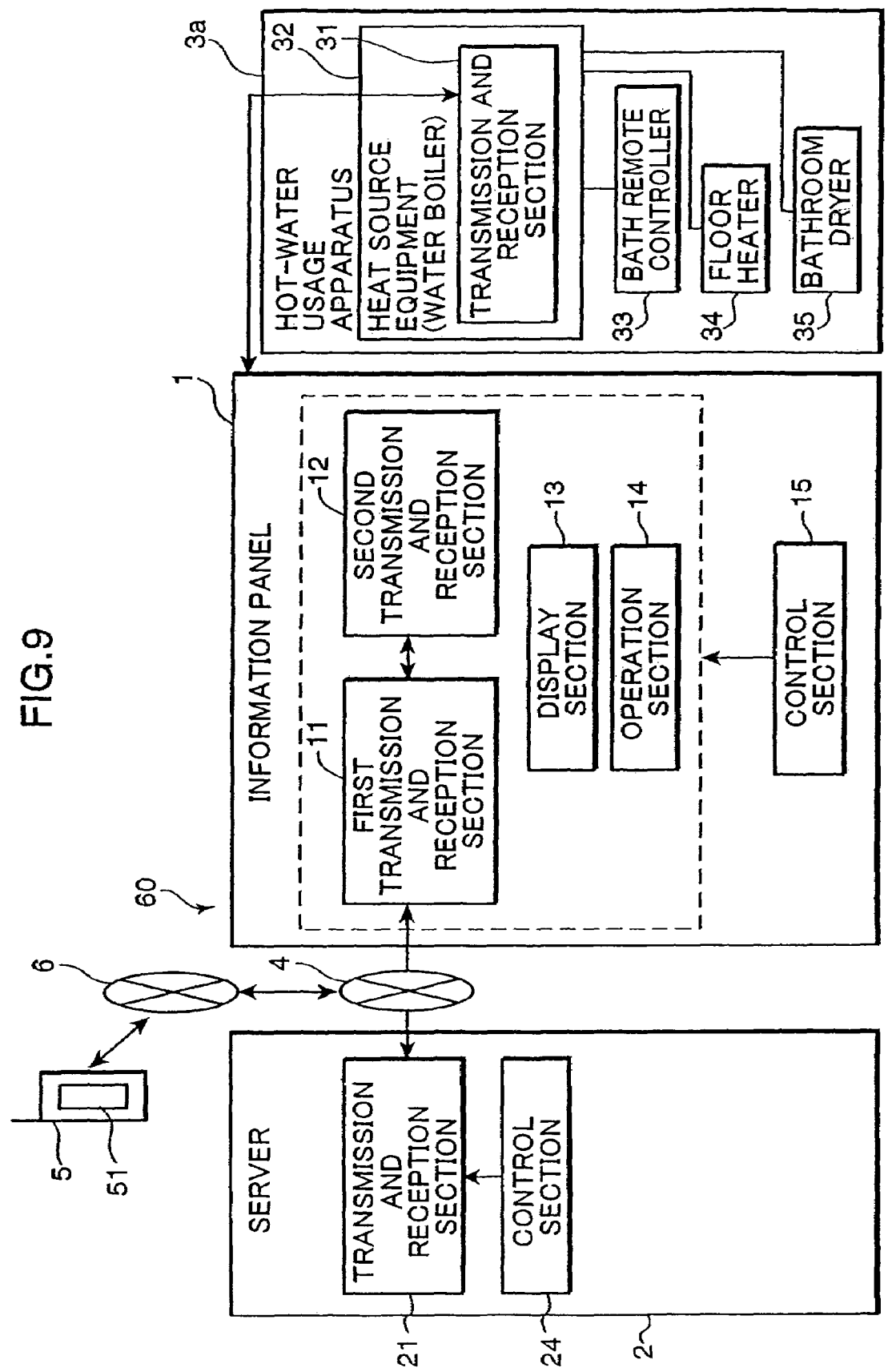
FIG. 9 is a block diagram, more specifically showing an information transfer according to the second embodiment.

Herein, the information transfer according to the second embodiment will be more specifically described. FIG. 9 is a block diagram, more specifically showing the information transfer according to the second embodiment. Herein, in the following description, an example is described in which the electrical equipment is applied as a hot-water usage apparatus. The hot-water usage apparatus is an apparatus which creates hot water using an energy source such as gas, electric power and oil, and supplies the hot water which is used directly in a bath, a kitchen, a washroom or the like. In addition, it is an apparatus which has the function of, using the hot water it creates, floor heating, bathroom heating, bathroom drying, heating by a fan heater or an air conditioner, or the like.

An information transfer system 60 shown in FIG. 9 is configured by the information panel 1, the server 2, the hot-water usage apparatus 3a and the cellular telephone 5. Herein, the configuration of the information panel 1, the server 2 and the cellular telephone 5 in the information transfer system 60 shown in FIG. 9 is the same as the configuration of the information panel 1, the server 2 and the cellular telephone 5 shown in FIG. 7. Hence, it is given the same reference numerals, and thus, its detailed description is omitted. Therefore, in the following description, only the configurations are described which are different from those of the information transfer system 50 shown in FIG. 7.

The information panel 1 is communicably connected to the server 2, via an information network 4 (hereinafter, referred to as the network 4). It is, for example, a controller which controls the hot-water usage apparatus 3a. The information panel 1 is made up of a first transmission and reception section 11, a second transmission and reception section 12, a display section 13, an operation section 14, and a control section 15. Herein, the information panel 1 according to this embodiment is a controller which controls the hot-water usage apparatus 3a. However, the present invention is not limited only to this. It may also be, for example, a remote controller, a personal computer, a television, or the like. In addition, the information panel 1 may also control not only the hot-water usage apparatus 3a but also another piece of electrical equipment.

The server 2 is communicably connected via the network 4 to the information panel 1 and is also communicably connected, via the cell-phone network 6 and the network 4, to the cellular telephone 5. It is made up of the transmission and reception section 21, a trigger generation section 22, a buffer 23, and a control section 24. Herein, in this embodiment, the server 2 may also be information equipment, such as a personal computer, a portable terminal and a mobile phone.

The hot-water usage apparatus 3a is formed by a heat source equipment 32, a bath remote controller 33, a floor heater 34, and a bathroom dryer 35. The heat source equipment 32 creates and supplies hot water, using gas, electricity or oil as an energy source. It is a so-called water boiler. The heat source equipment 32 has a hot-water supplying function of supplying the hot water it creates to a bath, a kitchen, a washroom, or the like. It also has a heating function of using the hot water it creates as a heat source of floor heating, a bathroom heater, a bathroom dryer, a fan heater, an air conditioner, or the like. Besides, the heat source equipment 32 is provided with the transmission and reception section 31. The transmission and reception section 31 transmits information to the second transmission and reception section 12 of the information panel 1, and receives information which is transmitted by the second transmission and reception section 12 of the information panel 1. The bath remote controller 33 controls a hot-water supply or the like and is mainly installed in a bath. The floor heater 34 warms a floor, using the hot water which is created by the heat source equipment 32. The bathroom dryer 35 dries a bathroom, using the hot water which is created by the heat source equipment 32. Herein, the floor heater 34 and the bathroom dryer 35 may also be equipment which uses the hot water of a bathroom heater, a fan heater, an air conditioner, or the like.

Next, the operation of the information transfer system 60 shown in FIG. 9 will be described. Herein, the following description is given with reference to the information transfer procedure shown in FIG. 8.

The first transmission and reception section 11 of the information panel 1 periodically transmits, to the server 2, IP address information (or a periodic UDP) based on a UDP protocol. The transmission and reception section 21 of the server 2 receives the periodic UDP which is transmitted by the first transmission and reception section 11 of the information panel 1. Then, it transmits confirmation information (or a confirmation UDP) based on a UDP protocol to the first transmission and reception section 11 of the information panel 1. The first transmission and reception section 11 of the information panel 1 receives the confirmation UDP which is transmitted by the transmission and reception section 21 of the server 2.

Herein, the transmission and reception section 51 of the cellular telephone 5 transmits, to the transmission and reception section 21 of the server 2, for example, a control request signal 165 for the hot-water usage apparatus 3a which can communicate with the information panel 1. Specifically, for example, the control request signal 165 for turning on the floor heater 34 which is connected to the heat source equipment 32. The transmission and reception section 21 of the server 2 receives the control request signal 165 which has been transmitted by the cellular telephone 5. At this time, between the server 2 and the information panel 1, a session is established by the periodic UDP 163 which is issued from the information panel 1. Then, the transmission and reception section 21 of the server 2 promptly transmits the request response UDP 166 to the IP address of the information panel 1 at the point of time, or the transmission-origin address of the periodic UDP 163.

The first transmission and reception section 11 of the information panel 1 receives the request response UDP 166 which has been transmitted by the transmission and reception section 21 of the server 2. Then, it transmits the confirmation UDP 167 to the transmission and reception section 21 of the server 2. The transmission and reception section 21 of the server 2 receives the confirmation UDP 167 which is transmitted by the first transmission and reception section 11 of the information panel 1. The information panel 1 which has received the request response UDP 166 transfers a control processing signal 168 from the second transmission and reception section 12 to the transmission and reception section 31 of the hot-water usage apparatus 3a, so that the hot-water usage apparatus 3a can be controlled as prescribed. Herein, the prescribed control means, for example, various kinds of control such as default control and timer control which the hot-water usage apparatus 3a has, various types of setting such as timer setting, or the like. In other words, if the control request which has been transmitted by the transmission and reception section 51 of the cellular telephone 5 is a request to start hot-water supply to a bath, the transmission and reception section 21 of the server 2 transmits the request response UDP 166 to the first transmission and reception section 11 of the information panel 1. The first transmission and reception section 11 of the information panel 1 receives the request response UDP 166 which has been transmitted by the transmission and reception section 21 of the server 2. The second transmission and reception section 12 of the information panel 1 transmits, to the hot-water usage apparatus 3a, the control processing signal 168 for starting the hot-water supply to the bath. The transmission and reception section 31 of the hot-water usage apparatus 3a receives the control processing signal 168 which has been transmitted by the second transmission and reception section 12 of the information panel 1.

Through the above described series of information transfers, the hot-water usage apparatus 3a starts to supply hot water to the bath. Besides, the transmission and reception section 31 of the hot-water usage apparatus 3a transmits, to the second transmission and reception section 12 of the information panel 1, the state change information 169 relating to a change in the state of the hot-water usage apparatus 3a. It includes, for example, starting to supply hot water to the bath, finishing the hot-water supply after a predetermined time elapses and the volume of hot water supplied to the bath reaches a proper quantity, or the like. The second transmission and reception section 12 of the information panel 1 receives the state change information 169 from the hot-water usage apparatus 3a. The first transmission and reception section 11 of the information panel 1 transmits the result TCP 170 to the transmission and reception section 21 of the server 2. The transmission and reception section 21 of the server 2 receives the result TCP 170 which has been transmitted by the first transmission and reception section 11 of the information panel 1 and transmits the result signal 171 which is state change information to the transmission and reception section 51 of the cellular telephone 5. The transmission and reception section 51 of the cellular telephone 5 receives the result signal 171 which has been transmitted by the transmission and reception section 21 of the server 2, so that the series of pieces of information transfer processing is completed.

Herein, the hot-water usage apparatus 3a is not necessarily controlled by communicating with the information panel 1. Needless to say, it may also be directly connected to a terminal of the information panel 1 or the like, so that it can be controlled. Besides, the request response UDP 166 may also be a signal of a TCP protocol. In that case, there is no need for the confirmation UDP 167 with respect to the request response UDP 166. Thereby, using a signal based on a TCP protocol, a request response information can be certainly transmitted.

Moreover, needless to say, the state change information 169, the result TCP 170 and the result signal 171 may also be sent out, not only when a change is made in the state of the hot-water usage apparatus 3a, the information panel 1, or the like, but also when the state at a fixed point of time of the hot-water usage apparatus 3a, the information panel 1 or the like is transferred at regular intervals.

Furthermore, in this embodiment, an example is described in which the electrical equipment 3 is applied to the hot-water usage apparatus 3a. However, the present invention is not limited only to this. The electrical equipment 3 may also be applied to a security apparatus in which various sensors, such as an opening-and-shutting sensor, a human-presence sensor, a fire sensor and a gas-leakage sensor, keep a watch, and the sensors operate to issue a voice or a report, or to allow a security guard to rush to a house. Besides, the electrical equipment 3 may also be an air conditioner, a washing machine, heating cooking equipment such as a microwave oven, a rice cooker and an IH cooker, or a freezing refrigeration apparatus such as a refrigerator, a freezer, a freezing refrigerator.

Figure 10:
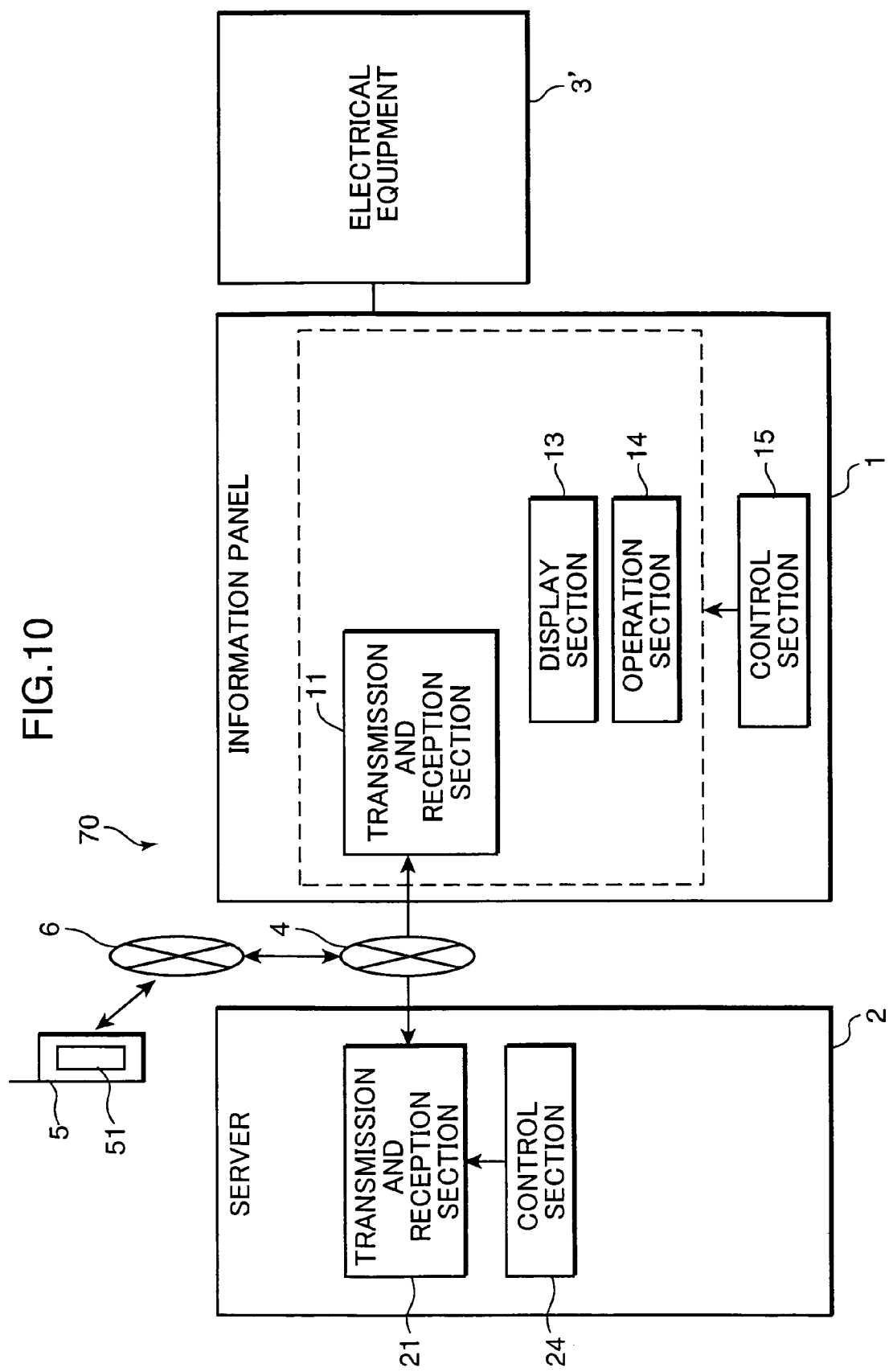
FIG. 10 is a block diagram, showing the whole configuration of an information transfer system according to a variation of the second embodiment.

Next, description is given of an information transfer system according to a variation of the second embodiment of the present invention. FIG. 10 is a block diagram, showing the whole configuration of the information transfer system according to the variation of the second embodiment. The component elements which have the same reference numerals as those of the information transfer system 50 according to the second embodiment shown in FIG. 7, have the identical functions. An information transfer system 70 shown in FIG. 10 is configured by the information panel 1, the server 2, the electrical equipment 3' and the cellular telephone 5. Herein, as the electrical equipment 3', various kinds of equipment can be used in the same way as the electrical equipment 3 according to the second embodiment. The electrical equipment 3' is directly connected to a terminal of the information panel 1, so that it can be controlled by the information panel 1. Therefore, the information panel 1 is different from that of the information transfer system 50 shown in FIG. 7. It is made up only of a transmission and reception section 11, the display section 13, the operation section 14, and the control section 15.

Herein, the information panel 1 according to this embodiment is a controller which controls the electrical equipment 3'. However, the present invention is not limited only to this. It may also be, for example, a remote controller, a personal computer, a television, or the like. In addition, the information panel 1 may also control a plurality of pieces of electrical equipment, not a single piece of electrical equipment. Furthermore, in this embodiment, the server 2 may also be information equipment, such as a personal computer, a portable terminal and a mobile phone.

Figure 11:
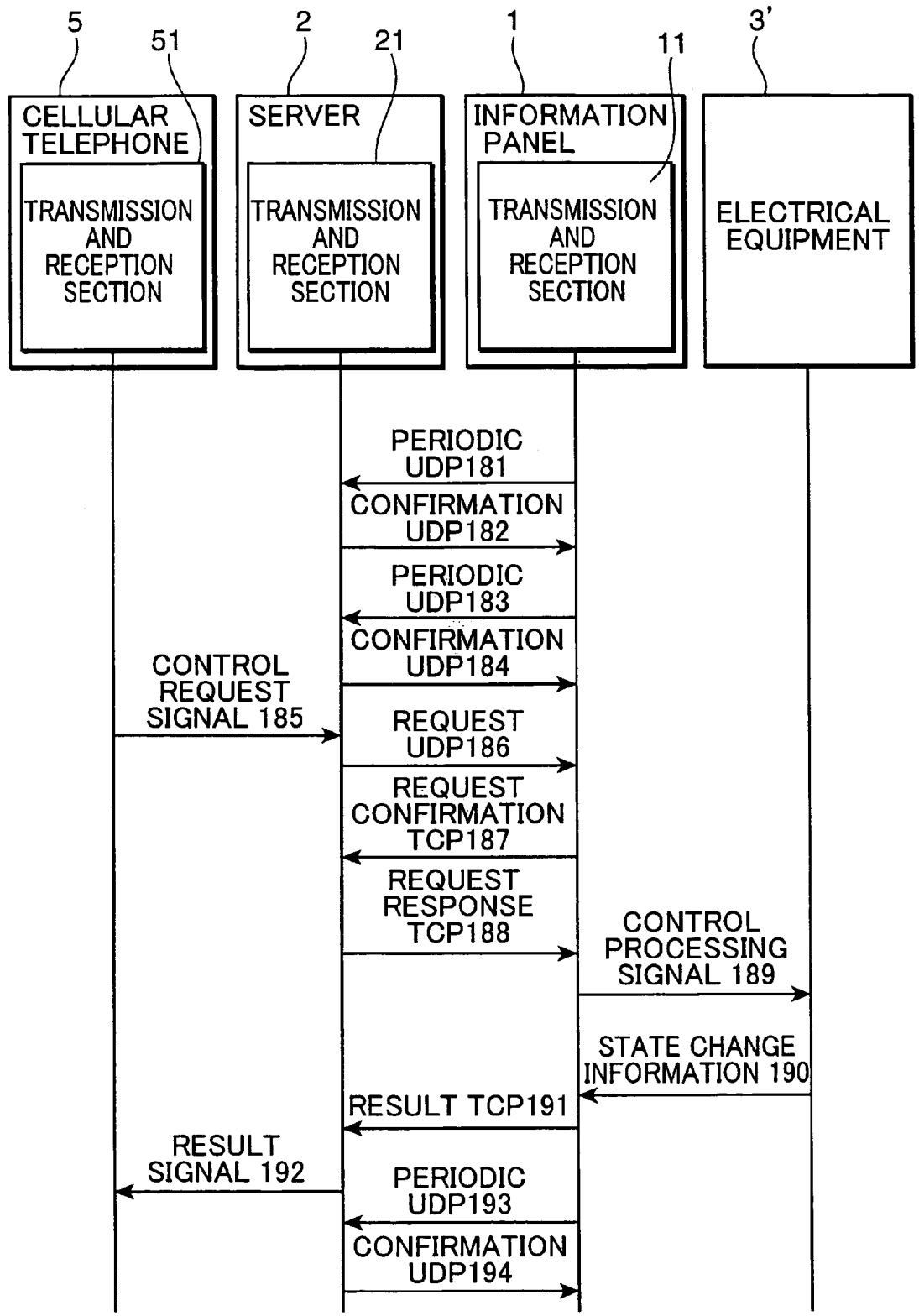
FIG. 11 is a diagram, showing an information transfer procedure of the information transfer system according to the variation of the second embodiment shown in FIG. 10.

FIG. 11 is a diagram, showing an information transfer procedure of the information transfer system 70 according to the variation of the second embodiment shown in FIG. 10. FIG. 11 shows the exchange of information by the transmission and reception section 11 of the information panel 1, the transmission and reception section 21 of the server 2, the electrical equipment 3' and the transmission and reception section 51 of the cellular telephone 5. Reference numerals 181 to 194 designate the contents of each piece of information. Herein, in FIG. 11, periodic UDPs 181, 183, 193 represent IP address information which the information panel 1 transmits periodically based on a UDP protocol. Confirmation UDPs 182, 184, 194 represent confirmation information which the server 2 issues, for the periodic UDPs 181, 183, 193 from the information panel 1, based on the UDP protocol. A request UDP 186 indicates request information which the server 2 issues based on the UDP protocol. A request confirmation TCP 187 indicates request confirmation information which the information panel 1 issues, for the request UDP 186 from the server 2, based on the TCP protocol. A request response TCP 188 indicates request response information which the server 2 issues, for the request confirmation TCP 187 from the information panel 1, based on the TCP protocol. A result TCP 191 indicates result information which the information panel 1 issues based on a TCP protocol. For example, the result TCP 191 is state-change data on the electrical equipment 3', a response result to a control request, or the like. For example, if the electrical equipment 3' is a gas hot-water supplier, then using the result TCP 191, information on the gas hot-water supplier is transferred through the information panel 1 to the server 2. Such information includes, as a control instruction for the gas hot-water supplier, starting to supply hot water to a bath or finishing hot-water supply after a predetermined time elapses and the volume of hot water supplied into a bathtub reaches a proper quantity. Of course, the electrical equipment 3' may also be equipment except a gas hot-water supplier, and needless to say, a control request can also be other than starting to supply hot water to a bath.

Herein, in this embodiment, a UDP protocol is used as the connectionless-type protocol, and a TCP protocol is used as the connection-type protocol. However, the present invention is not limited only to this. Connectionless-type protocols other than a UDP protocol may also be used, and connection-type protocols other than a TCP protocol may also be used.

Next, the operation of the information transfer system 70 shown in FIG. 10 will be described using the information transfer procedure shown in FIG. 11. In this embodiment, the information panel 1 is connected to the network (or the Internet) 4. An IP address which the information panel 1 has is not connected to the network 4 through a global address that is constantly fixed, but connected to the network 4 through an IP address that is sequentially switched by a provider or the like. Therefore, the IP address of the information panel 1 is not a fixed address, and thus, the server 2 cannot become constantly aware of the IP address of the information panel 1. Hence, when a trigger is generated in the trigger generation section 22 of the server 2, the information panel 1 transmits IP address information periodically so as to inform the server 2 of the IP address of the information panel 1 at the point of time. This is the periodic UDPs 181, 183, 193 shown in FIG. 11. In this way, the information panel 1 transmits the IP address information periodically to the server 2, so that the server 2 can certainly transfer the information to the information panel 1. Thus, it can certainly control the information panel 1 and can certainly monitor the state of the information panel 1.

Herein, the interval of time from the transmission of the periodic UDP 181 to the transmission of the periodic UDP 183 by the first transmission and reception section 11 of the information panel 1 is preset, for example, at two minutes. Besides, there is a case where if a certain time passes, the session of the information panel 1 and the server 2 is automatically opened. In this case, the transmission and reception section 11 of the information panel 1 may also transmit a periodic UDP by detecting the session being opened.

In addition, the transmission and reception section 11 of the information panel 1 may also learn the time from the establishment of a session of the information panel 1 and the server 2 to the opening of the session. In that case, the interval of time at which a periodic UDP is transmitted can be set according to the learned time. Specifically, the transmission and reception section 11 of the information panel 1 lengthens, little by little, the interval of time at which a periodic UDP is transmitted after the previous periodic UDP has been transmitted. If it cannot receive a confirmation UDP, it shortens the time interval from the transmission of a periodic UDP to the transmission of the following periodic UDP.

In this way, the period of time is learned from the establishment of a session of the information panel 1 and the server 2 to the opening of the session. Then, according to the learned time, the time interval is set from the transmission of information based on a connectionless-type protocol to the transmission of information based on the next connectionless-type protocol. Therefore, the session of the information panel 1 and the server 2 can always be kept established, thus avoiding a state where the session stays opened. This is especially effective in a case where the session is automatically opened.

The transmission and reception section 51 of the cellular telephone 5 transmits a control request signal 185 to the transmission and reception section 21 of the server 2. The transmission and reception section 21 of the server 2 receives the control request signal 185 which has been transmitted by the cellular telephone 5. At this time, between the server 2 and the information panel 1, a session is established by the periodic UDP 183 which is issued from the information panel 1. Then, the transmission and reception section 21 of the server 2 promptly transmits the request UDP 186 to the IP address of the information panel 1 at the point of time, or the transmission-origin address of the periodic UDP 183.

Herein, for example, if the periodic UDP 183 is a signal based on a TCP protocol, then at the point of time when the communication of the periodic signal of the TCP protocol is completed, a series of pieces of processing is executed such as returning an ACK signal from the server 2 to the information panel 1. Thereafter, the session of the server 2 and the information panel 1 is opened. Therefore, at the point of time when the session has been opened, the server 2 cannot become aware of the IP address of the information panel 1. This makes it impossible for the transmission and reception section 21 of the server 2 to transmit the request UDP 186 instantly when the control request signal 185 has been generated.

On the other hand, in this embodiment, the periodic UDP 183 is a signal based on a UDP protocol, and thus, the session is not necessarily opened at the point of time when the communication is completed. Therefore, when the control request signal 185 is produced, the server 2 is aware of the IP address of the information panel 1 at the point of time. Hence, the transmission and reception section 21 of the server 2 can transmit the request UDP 186 immediately to the information panel 1. The transmission and reception section 11 of the information panel 1 which has received the request UDP 186 transmits the request confirmation TCP 187 to the server 2. The transmission and reception section 21 of the server 2 receives the request confirmation TCP 187 which has been transmitted by the transmission and reception section 11 of the information panel 1. Then, it transmits the request response TCP 188 to the transmission and reception section 11 of the information panel 1.

Herein, the server 2 receives the control request signal 185 and does not instantly send out the request response TCP 188. It transmits the request UDP 186 and sends out the request response TCP 188 after receiving the request confirmation TCP 187. This is because much of the information of the information panel 1 inside of the server 2 in the stage where the control request signal 185 has been generated, or the information except the IP address information of the information panel 1 at the point of time when a transfer has been executed through the periodic UDP 183, has some doubt as to its immediacy. For example, even if the periodic UDP 183 includes the state information on the electrical equipment 3' or the information panel 1 itself, before the control request signal 185 is generated, a change in the state of the electrical equipment 3' may be taking place, such as whether it has been turned on or off, or whether it is now supplying hot water or it has finished supplying hot water. Hence, it is not necessarily correct. Therefore, in the case where the electrical equipment 3' or the information panel 1 itself is controlled, or in the case where information is transferred, control needs to be executed by accurately recognizing the state information such as the on-and-off state, temperature-setting state and timer-setting state of the electrical equipment 3' at the point of time when the control request signal 185 has been generated. Besides, in the case where a measure to lessen the information of a periodic UDP to the utmost or the like is taken so that traffic on the Internet 4 can be lightened, the information which is transferred by the periodic UDP 183 is reduced. Thus, in order to become aware of the information at the point of time when the control request signal 185 has been generated, the information has to be confirmed over again. Hence, a procedure is executed in which the request UDP 186 is first sent out to the information panel 1, then the request confirmation TCP 187 including various kinds of information is sent out from the information panel 1, and after this, the server 2 sends out the request response TCP 188 to the information panel 1.

The information panel 1 which has received the request response TCP 188 outputs a control processing signal 189 to the electrical equipment 3', so that the electrical equipment 3' can be controlled as prescribed. Herein, the prescribed control means, for example, various kinds of control such as default control and timer control which the electrical equipment 3' has, various types of setting such as timer setting, or the like. When the state of the electrical equipment 3' changes according to the result of control by the control processing signal 189 or the like, state change information 190 is outputted from the electrical equipment 3' to the information panel 1. Then, the result is transferred as the result TCP 191 to the server 2, and a result signal 192 which is state change information is transferred from the server 2 to the cellular telephone 5. Thus, the series of information transfers is completed. Herein, the state of the electrical equipment 3' indicates an electrically-detectable state of the electrical equipment 3'.

Herein, for example, let's assume the electrical equipment 3' which can communicate with the information panel 1 to be a gas hot-water supplier. If a control request for the gas hot-water supplier which is generated in the cellular telephone 5 is a request to start hot-water supply to a bath, the transmission and reception section 51 of the cellular telephone 5 transmits the control request signal 185 to the transmission and reception section 21 of the server 2. The transmission and reception section 21 of the server 2 receives the control request signal 185 which has been transmitted by the transmission and reception section 51 of the cellular telephone 5. Then, it transmits the request UDP 186 to start the hot-water supply to the bath to the transmission and reception section 11 of the information panel 1. The transmission and reception section 11 of the information panel 1 receives the request UDP 186 which has been transmitted by the transmission and reception section 21 of the server 2. Then, it transmits the request confirmation TCP 187 to the transmission and reception section 21 of the server 2. The transmission and reception section 21 of the server 2 receives the request confirmation TCP 187 which has been transmitted by the transmission and reception section 11 of the information panel 1, and transmits the request response TCP 188. The transmission and reception section 11 of the information panel 1 receives the request response TCP 188 which has been transmitted by the transmission and reception section 21 of the server 2. Then, it outputs, to the gas hot-water supplier, the control processing signal 189 for starting the hot-water supply to the bath.

Through the above described series of information transfers, the gas hot-water supplier starts to supply hot water to the bath. Besides, the gas hot-water supplier outputs, to the information panel 1, the state change information 190 on a change in the state of the gas hot-water supplier. It includes, for example, starting to supply hot water to the bath, finishing the hot-water supply after a predetermined time elapses and the volume of hot water supplied to the bath reaches a proper quantity, or the like. Then, the state change information 190 from the gas hot-water supplier is inputted in the information panel 1. The transmission and reception section 11 of the information panel 1 transmits the result TCP 191 to the transmission and reception section 21 of the server 2. The transmission and reception section 21 of the server 2 receives the result TCP 191 which has been transmitted by the transmission and reception section 11 of the information panel 1 and transmits the result signal 192 to the transmission and reception section 51 of the cellular telephone 5. The transmission and reception section 51 of the cellular telephone 5 receives the result signal 192 which has been transmitted by the transmission and reception section 21 of the server 2. Thus, the series of pieces of information transfer processing is completed. Naturally, the electrical equipment 3' may also be equipment except a gas hot-water supplier, and the information network 4 may also be except for the Internet. Needless to say, a control request can also be other than starting to supply hot water to a bath. Besides, it is natural that the information panel 1 continues to send out a periodic UDP like the periodic UDP 193, even after the series of information transfers is completed.

Herein, a periodic UDP does not necessarily continue to be sent out at a fixed interval, as long as it is sent out substantially at a certain interval. In addition, for a signal based on a UDP protocol, an ACK signal is not returned when it is transferred. Hence, it becomes less reliable than a signal based on a TCP protocol. Therefore, if the transmission and reception section 21 of the server 2 receives the periodic UDPs 181, 183, 193, it transmits the confirmation UDPs 182, 184, 194 to the transmission and reception section 11 of the information panel 1. In this way, for the periodic UDPs 181, 183, 193, the confirmation UDPs 182, 184, 194 are sent out from the server 2 to the information panel 1, so that the information transfer becomes more reliable.

Furthermore, the information panel 1 includes the display section 13 or the operation section 14. Thereby, in the information panel 1, information can be confirmed, such as the state of the electrical equipment 3' and the confirmation of the communication state with the server 2. This presents an extremely great advantage, such as setting the contents of information sending. Besides, if the cellular telephone 5 is provided with a display section, the display section provided in the cellular telephone 5 can display state change information which is included in the result signal 192 that has been received by the transmission and reception section 51. This makes it possible for a user to confirm the state of the electrical equipment 3 outdoors. Herein, the electrical equipment 3' is connected to a terminal of the information panel 1. Needless to say, however, it may also be controlled by communicating with the information panel 1.

Moreover, in this embodiment, description is given about the transfer of information for controlling the electrical equipment 3'. Needless to say, in the same was as described above, the present invention can be applied to the control of the information panel 1 itself, or the transfer of information like life information, such as a weather forecast, a timetable, the present time, a gas consumption, a power consumption, a water consumption, a gas rate, a power rate and a water rate, or the like. Furthermore, the electrical equipment 3' according to this embodiment may also be various meters, such as a gas meter, an electric-power meter and a water meter. If the electrical equipment 3' is various meters such as a gas meter, an electric-power meter and a water meter, the information transfer system may also be applied to an information transfer for executing control such as the remote cutoff and remote return (opening) of a meter. Moreover, needless to say, the state change information 190, the result TCP 191 and the result signal 192 may also be sent out, not only when a change is made in the state of the electrical equipment 3', the information panel 1, or the like, but also when the state at a fixed point of time of the electrical equipment 3', the information panel 1 or the like is transferred at regular intervals.

Figure 12:
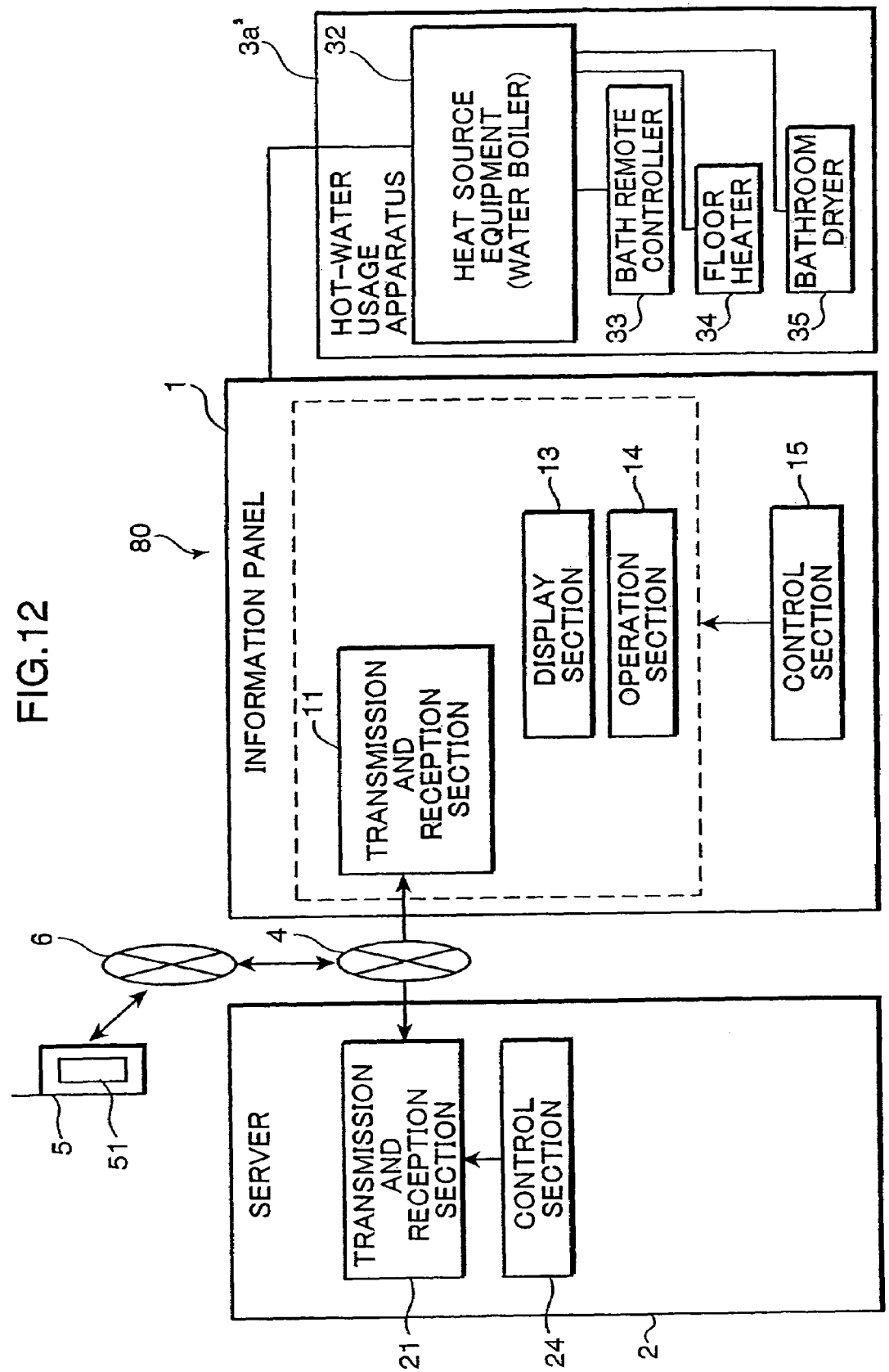
FIG. 12 is a block diagram, more specifically showing an information transfer according to the variation of the second embodiment.
Figure 13:
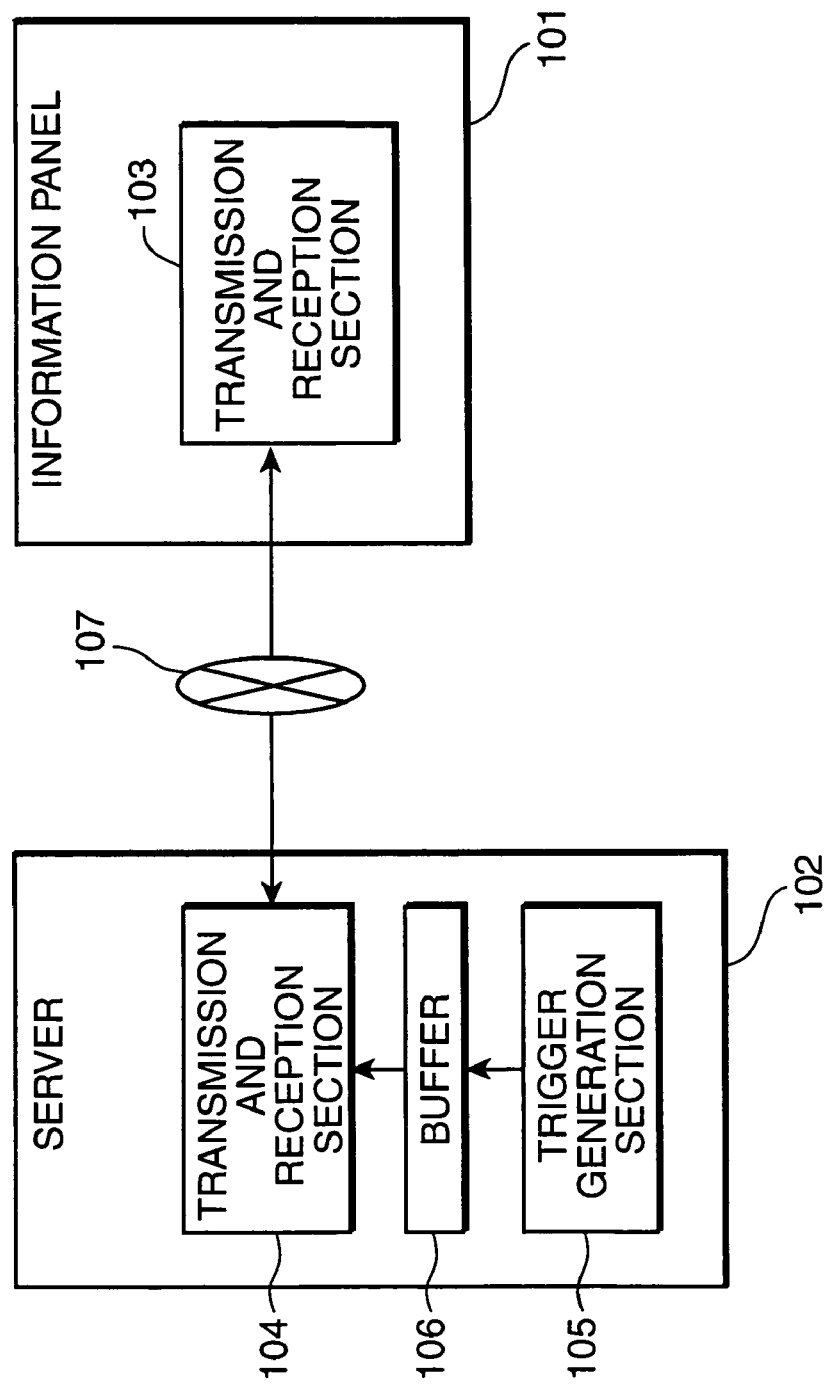
FIG. 13 is a block diagram, showing the whole configuration of a conventional information transfer system.

Herein, the information transfer according to the variation of the second embodiment will be more specifically described. FIG. 12 is a block diagram, more specifically showing the information transfer according to the variation of the second embodiment. Herein, in the following description, an example is described in which the electrical equipment is applied as a hot-water usage apparatus. The hot-water usage apparatus is an apparatus which creates hot water using an energy source such as gas, electric power and oil, and supplies the hot water which is used directly in a bath, a kitchen, a washroom or the like. In addition, it is an apparatus which has the function of, using the hot water it creates, floor heating, bathroom heating, bathroom drying, heating by a fan heater or an air conditioner, or the like.

An information transfer system 80 shown in FIG. 12 is configured by the information panel 1, the server 2, the hot-water usage apparatus 3a' and the cellular telephone 5. Herein, the configuration of the information panel 1, the server 2 and the cellular telephone 5 in the information transfer system 80 shown in FIG. 12 is the same as the configuration of the information panel 1, the server 2 and the cellular telephone 5 in the information transfer system 70 shown in FIG. 10. Hence, it is given the same reference numerals, and thus, its detailed description is omitted. Therefore, in the following description, only the configurations are given which are different from those of the information transfer system 70 shown in FIG. 10.

The information panel 1 is communicably connected to the server 2, via an information network 4 (hereinafter, referred to as the network 4). It is, for example, a controller which controls the hot-water usage apparatus 3a'. The information panel 1 is made up of a transmission and reception section 11, a display section 13, an operation section 14, and a control section 15. Herein, the information panel 1 according to this embodiment is a controller which controls the hot-water usage apparatus 3a'. However, the present invention is not limited only to this. It may also be, for example, a remote controller, a personal computer, a television, or the like. In addition, the information panel 1 may also control not only the hot-water usage apparatus 3a' but also another piece of electrical equipment.

The server 2 is communicably connected via the network 4 to the information panel 1 and is also communicably connected via the cell-phone network 6 and the network 4 to the cellular telephone 5. It is made up of the transmission and reception section 21, a trigger generation section 22, a buffer 23, and a control section 24. Herein, in this embodiment, the server 2 may also be information equipment, such as a personal computer, a portable terminal and a mobile phone.

The hot-water usage apparatus 3a' is formed by a heat source equipment 32, a bath remote controller 33, a floor heater 34, and a bathroom dryer 35. The heat source equipment 32 creates and supplies hot water, using gas, electricity or oil as an energy source. It is a so-called water boiler. The heat source equipment 32 has a hot-water supplying function of supplying the hot water it creates to a bath, a kitchen, a washroom, or the like. It also has a heating function of using the hot water it creates as a heat source of floor heating, a bathroom heater, a bathroom dryer, a fan heater, an air conditioner, or the like. The bath remote controller 33 controls a hot-water supply or the like and is mainly installed in a bath. The floor heater 34 warms a floor, using the hot water which is created by the heat source equipment 32. The bathroom dryer 35 dries a bathroom, using the hot water which is created by the heat source equipment 32. Herein, the floor heater 34 and the bathroom dryer 35 may also be equipment which uses the hot water of a bathroom heater, a fan heater, an air conditioner, or the like.

Next, the operation of the information transfer system 80 shown in FIG. 12 will be described. Herein, the following description is given with reference to the information transfer procedure shown in FIG. 11.

The transmission and reception section 11 of the information panel 1 periodically transmits, to the server 2, IP address information (or a periodic UDP) based on a UDP protocol. The transmission and reception section 21 of the server 2 receives the periodic UDP which is transmitted by the transmission and reception section 11 of the information panel 1. Then, it transmits confirmation information (or a confirmation UDP) based on a UDP protocol to the transmission and reception section 11 of the information panel 1. The transmission and reception section 11 of the information panel 1 receives the confirmation UDP which is transmitted by the transmission and reception section 21 of the server 2.

Herein, the transmission and reception section 51 of the cellular telephone 5 transmits, to the transmission and reception section 21 of the server 2, for example, a control request signal 185 for the hot-water usage apparatus 3a' which can communicate with the information panel 1. Specifically, for example, the control request signal 185 for turning on the floor heater 34 which is connected to the heat source equipment 32. The transmission and reception section 21 of the server 2 receives the control request signal 185 which has been transmitted by the cellular telephone 5. At this time, between the server 2 and the information panel 1, a session is established by the periodic UDP 183 which is issued from the information panel 1. Then, the transmission and reception section 21 of the server 2 promptly transmits the request response UDP 186 to the IP address of the information panel 1 at the point of time, or the transmission-origin address of the periodic UDP 183.

The transmission and reception section 11 of the information panel 1 receives the request UDP 186 which has been transmitted by the transmission and reception section 21 of the server 2. Then, it transmits the request confirmation TCP 187 to the transmission and reception section 21 of the server 2. The transmission and reception section 21 of the server 2 receives the request confirmation TCP 187 which is transmitted by the transmission and reception section 11 of the information panel 1. Then, it transmits the request response TCP 188 for the request confirmation TCP 187 to the transmission and reception section 11 of the information panel 1. The information panel 1 which has received the request response TCP 188 outputs a control processing signal 189 to the heat source equipment 32 of the hot-water usage apparatus 3a', so that the hot-water usage apparatus 3a' can be controlled as prescribed. Herein, the prescribed control means, for example, various kinds of control such as default control and timer control which the hot-water usage apparatus 3a' has, various types of setting such as timer setting, or the like. In other words, if the control request which has been transmitted by the transmission and reception section 51 of the cellular telephone 5 is a request to start hot-water supply to a bath, the transmission and reception section 21 of the server 2 transmits the request response TCP 188 to the transmission and reception section 11 of the information panel 1. The transmission and reception section 11 of the information panel 1 receives the request response TCP 188 which has been transmitted by the transmission and reception section 21 of the server 2. The information panel 1 outputs, to the heat source equipment 32 of the hot-water usage apparatus 3a', the control processing signal 189 for starting the hot-water supply to the bath. The control processing signal 189 which has been transmitted by the information panel 1 is inputted in the heat source equipment 32 of the hot-water usage apparatus 3a'.

Through the above described series of information transfers, the hot-water usage apparatus 3a' starts to supply hot water to the bath. Besides, the heat source equipment 32 of the hot-water usage apparatus 3a' outputs, to the information panel 1, the state change information 190 on a change in the state of the hot-water usage apparatus 3a'. It includes, for example, starting to supply hot water to the bath, finishing the hot-water supply after a predetermined time elapses and the volume of hot water supplied to the bath reaches a proper quantity, or the like. The state change information 190 from the hot-water usage apparatus 3a' is inputted in the information panel 1. The transmission and reception section 11 of the information panel 1 transmits the result TCP 191 to the transmission and reception section 21 of the server 2. The transmission and reception section 21 of the server 2 receives the result TCP 191 which has been transmitted by the transmission and reception section 11 of the information panel 1, and transmits the result signal 192 to the transmission and reception section 51 of the cellular telephone 5. The transmission and reception section 51 of the cellular telephone 5 receives the result signal 192 which has been transmitted by the transmission and reception section 21 of the server 2. Thus, the series of pieces of information transfer processing is completed.

Moreover, needless to say, the state change information 190, the result TCP 191 and the result signal 192 may also be sent out, not only when a change is made in the state of the hot-water usage apparatus 3a', the information panel 1, or the like, but also when the state at a fixed point of time of the hot-water usage apparatus 3a', the information panel 1 or the like is transferred at regular intervals.

Furthermore, in this embodiment, an example is described in which the electrical equipment 3 is applied to the hot-water usage apparatus 3a, 3a'. However, the present invention is not limited only to this. The electrical equipment 3 may also be applied to a security apparatus in which various sensors, such as an opening-and-shutting sensor, a human-presence sensor, a fire sensor and a gas-leakage sensor, keep a watch, and the sensors operate to issue a voice or a report, or to allow a security guard to rush to a house. Besides, the electrical equipment 3 may also be an air conditioner, a washing machine, heating cooking equipment such as a microwave oven, a rice cooker and an IH cooker, or a freezing refrigeration apparatus such as a refrigerator, a freezer, a freezing refrigerator.

Furthermore, in this embodiment, description is given about the remote control of equipment. However, the present invention is not limited only to this. This art may also be used for a telemeter system which collects the state of equipment or a signal from a sensor.

In this embodiment, the first transmission and reception section 11 (or the transmission and reception section 11) of the information panel 1 may also detect the time from the establishment of a session to the opening of the session. In that case, if the detected time becomes shorter than a predetermined time, it notifies the information panel 1 or the server 2 that the time when the session is kept established has become shorter. Specifically, the first transmission and reception section 11 (or the transmission and reception section 11) of the information panel 1 lengthens, little by little, the interval of time at which a periodic UDP is transmitted after the previous periodic UDP has been transmitted. If it cannot receive a confirmation UDP, it shortens the time interval from the transmission of a periodic UDP to the transmission of the following periodic UDP. Then, if this time interval becomes shorter than a predetermined time, it notifies the information panel 1 or the server 2 that the time when the session is established has become shorter.

In this case, if the notification is given that the time when the session is established has become shorter, the first transmission and reception section 11 of the information panel 1 sets the time interval at which it transmits a periodic UDP, for example, to a predetermined time. Besides, if the notification is given that the time when the session is established has become shorter, the transmission and reception section 21 of the server 2 sets the time interval from the establishment to the opening of the session, for example, to a predetermined time. Herein, such a predetermined time is, for example, two minutes. In addition, in this embodiment, the information panel 1 decides that the time when the session is kept established has become shorter than a predetermined time. However, the present invention is not limited only to this. After the time when the session is established is transmitted to the server 2, the server 2 may also make a decision by comparing it with a predetermined time.

In this way, the first transmission and reception section 11 of the information panel 1 detects the time from the establishment of a session to the opening of the session. If the detected time becomes shorter than a predetermined time, the information panel 1 or the server 2 is notified that the time when the session is kept established has become shorter. Therefore, the amount of information which flows for a fixed time on a network can be reduced, thus preventing a delay or a loss of information.

Herein, the means described in this embodiment may also be implemented in the form of a program which co-operates a hard resource, such as electrical-and-information equipment, a computer and a server including a CPU (or a micro computer), an RAM, an ROM, a storage-and-recording unit and an I/O. In such a program form, if a record is made in a recording medium such as magnetic media and optical media, or if a distribution is executed using a communication circuit such as the Internet, then the distribution and update of a new function, or its installation, can be easily executed.

Summary of the Embodiments

Such various embodiments of the present invention as described above can be summarized as described below.

In the information transfer system according to the present invention where an electrical-equipment communication apparatus that communicates with electrical equipment and an information communication apparatus that is communicably connected, via a network, to the electrical-equipment communication apparatus transfer information mutually: the electrical-equipment communication apparatus includes a transmitting and receiving means for transmitting and receiving information, via the network, to and from the information communication apparatus; the information communication apparatus includes a transmitting and receiving means for transmitting and receiving information, via the network, to and from the electrical-equipment communication apparatus, and a trigger generating means for generating a communication request trigger which requests to communicate with the electrical-equipment communication apparatus; the transmitting and receiving means of the electrical-equipment communication apparatus periodically transmits information based on a connectionless-type protocol to the information communication apparatus; and the transmitting and receiving means of the information communication apparatus receives the information based on the connectionless-type protocol which is periodically transmitted by the transmitting and receiving means of the electrical-equipment communication apparatus. When the communication request trigger is generated by the trigger generating means, transmits request response information based on the connectionless-type protocol, or request response information based on a connection-type protocol, to a transmission-origin address of the information based on the connectionless-type protocol.

According to this configuration, before a communication request is generated in the trigger generating means, the transmitting and receiving means of the information communication apparatus receives information based on a connectionless-type protocol which is periodically transmitted from the electrical-equipment communication apparatus. Thereby, the session remains connected between it and the transmitting and receiving means of the electrical-equipment communication apparatus. Therefore, the transmitting and receiving means of the information communication apparatus can issue, to the transmission-origin address of the information based on the connectionless-type protocol, request response information based on a connectionless-type protocol or request response information based on a connection-type protocol, instantly without waiting for information based on the following connectionless-type protocol. Thus, the information transfer can be executed without a time lag from the communication-request generation in the trigger generating means to the transmission of request response information based on the connectionless-type protocol, or the request response information based on the connection-type protocol. Therefore, the time interval can be shortened from the generation of a control request in the information communication apparatus to the transfer of information to the electrical-equipment communication apparatus. Thereby, information provision or control can be realized in real time.

Furthermore, in the above described information transfer system: the transmitting and receiving means of the information communication apparatus receives the information based on the connectionless-type protocol which is periodically transmitted by the transmitting and receiving means of the electrical-equipment communication apparatus, and when the communication request trigger is generated by the trigger generating means, transmits request information based on the connectionless-type protocol to the transmission-origin address of the information based on the connectionless-type protocol; the transmitting and receiving means of the electrical-equipment communication apparatus receives the request information which is transmitted by the transmitting and receiving means of the information communication apparatus, and transmits request confirmation information based on the connection-type protocol to the information communication apparatus; and the transmitting and receiving means of the information communication apparatus receives the request confirmation information which is transmitted by the transmitting and receiving means of the electrical-equipment communication apparatus, and transmits request response information based on the connection-type protocol to the transmission-origin address of the request confirmation information.

According to this configuration, before a communication request is generated in the trigger generating means, the transmitting and receiving means of the information communication apparatus receives information based on a connectionless-type protocol which is periodically transmitted from the electrical-equipment communication apparatus. Thereby, the session remains connected between it and the transmitting and receiving means of the electrical-equipment communication apparatus. Therefore, the transmitting and receiving means of the information communication apparatus can issue, to the transmission-origin address of the information based on the connectionless-type protocol, request information based on a connectionless-type protocol, instantly without waiting for following information based on the connectionless-type protocol. Thus, the information transfer can be executed without a time lag from the communication-request generation in the trigger generating means to the transmission of request information based on the connectionless-type protocol. In addition, the request information based on the connectionless-type protocol aims at transferring, to the electrical-equipment communication apparatus, the fact that the communication request has been generated in the trigger generating means. Hence, it includes a smaller amount of information than the request response information based on a connectionless-type protocol which has detailed information such as the contents of communication. This helps reduce the amount of communication data on a network.

Moreover, in the above described information transfer system, the transmitting and receiving means of the electrical-equipment communication apparatus receives the request response information which is transmitted by the transmitting and receiving means of the information communication apparatus, and transmits result information based on the connection-type protocol to the transmission-origin address of the request response information. According to this configuration, result information based on a connection-type protocol is transmitted to the transmission-origin address of request response information, so that the state of the electrical-equipment communication apparatus can be transferred.

In addition, in the above described information transfer system, the information communication apparatus includes a server which is communicably connected via the network to the electrical-equipment communication apparatus. According to this configuration, the information communication apparatus includes the server which is communicably connected, via the network, to the electrical-equipment communication apparatus. Therefore, in the information transfer system where the electrical-equipment communication apparatus that communicates with the electrical equipment and the server that is communicably connected via the network to the electrical-equipment communication apparatus transfer information mutually: the electrical-equipment communication apparatus includes the transmitting and receiving means for transmitting and receiving information, via the network, to and from the server; and the server includes a transmitting and receiving means for transmitting and receiving information, via the network, to and from the electrical-equipment communication apparatus, and the trigger generating means for generating a communication request trigger which requests to communicate with the electrical-equipment communication apparatus. The transmitting and receiving means of the electrical-equipment communication apparatus periodically transmits information based on a connectionless-type protocol to the server; and the transmitting and receiving means of the server receives the information based on the connectionless-type protocol which is periodically transmitted by the transmitting and receiving means of the electrical-equipment communication apparatus, and when the communication request trigger is generated by the trigger generating means, transmits request response information based on the connectionless-type protocol, or request response information based on a connection-type protocol, to a transmission-origin address of the information based on the connectionless-type protocol. Therefore, the time interval can be shortened from the generation of a control request in the server to the transfer of information to the electrical-equipment communication apparatus. Thereby, information provision or control can be realized in real time.

Furthermore, in the above described information transfer system: the information communication apparatus includes a server which is communicably connected, via the network, to the electrical-equipment communication apparatus, and an information terminal which is communicably connected, via the network, to the server; the information terminal has a transmitting means for transmitting, to the server, a communication request trigger which requests to communicate with the electrical-equipment communication apparatus; the server has a transmitting and receiving means for transmitting and receiving information, via the network, to and from the electrical-equipment communication apparatus; and the transmitting and receiving means of the server receives the information based on the connectionless-type protocol which is periodically transmitted by the transmitting and receiving means of the electrical-equipment communication apparatus, and when receiving the communication request trigger which is transmitted by the transmitting means of the information terminal, transmits request response information based on the connectionless-type protocol, or request response information based on the connection-type protocol, to the transmission-origin address of the information based on the connectionless-type protocol.

According to this configuration, the information communication apparatus includes a server which is communicably connected, via the network, to the electrical-equipment communication apparatus, and an information terminal which is communicably connected, via the network, to the server. In the information transfer system where the electrical-equipment communication apparatus that communicates with the electrical equipment, the server that is communicably connected, via the network, to the electrical-equipment communication apparatus and the information terminal that is communicably connected via the network to the server, transfer information mutually: the electrical-equipment communication apparatus includes the transmitting and receiving means for transmitting and receiving information, via the network, to and from the server; the server includes a transmitting and receiving means for transmitting and receiving information, via the network, to and from the electrical-equipment communication apparatus; and the information terminal includes the transmitting means for transmitting a communication request trigger which requests to communicate with the electrical-equipment communication apparatus. The transmitting and receiving means of the electrical-equipment communication apparatus periodically transmits information based on a connectionless-type protocol to the server; the transmitting and receiving means of the server receives the information based on the connectionless-type protocol which is periodically transmitted by the transmitting and receiving means of the electrical-equipment communication apparatus and when receiving the communication request trigger which is transmitted by the transmitting means of the information terminal, transmits request response information based on the connectionless-type protocol, or request response information based on a connection-type protocol, to a transmission-origin address of the information based on the connectionless-type protocol. Therefore, the time interval can be shortened from the generation of a control request in the information terminal to the transfer of information to the electrical-equipment communication apparatus. Thereby, information provision or control can be realized in real time.

Moreover, in the above described information transfer system, the transmitting and receiving means of the server receives the result information, and transmits the result information as a result signal to the information terminal. According to this configuration, the state of the electrical-equipment communication apparatus can be transferred, using the result information based on a connection-type protocol. In addition, the state of the electrical-equipment communication apparatus can be transferred as the result signal from the server to the information terminal.

In addition, in the above described information transfer system, the transmitting and receiving means of the information communication apparatus receives the information based on the connectionless-type protocol which is periodically transmitted by the transmitting and receiving means of the electrical-equipment communication apparatus, and at the time, transmits confirmation information based on the connectionless-type protocol, or confirmation information based on the connection-type protocol, to the transmission-origin address of the information based on the connectionless-type protocol. According to this configuration, a transfer confirmation can be executed of the periodically-transmitted information based on the connectionless-type protocol of which a communication transfer confirmation is not made as a basic protocol.

Furthermore, in the above described information transfer system, the transmitting and receiving means of the electrical-equipment communication apparatus receives the request response information based on the connectionless-type protocol, or the request information based on the connectionless-type protocol, which is transmitted by the transmitting and receiving means of the information communication apparatus, and at the time, for the request response information or the request information, transmits the confirmation information based on the connectionless-type protocol, or the confirmation information based on the connection-type protocol. According to this configuration, a transfer confirmation can be executed of the request response information based on the connectionless-type protocol, or the request information based on the connectionless-type protocol, of which a communication transfer confirmation is not made as a basic protocol.

Moreover, in the above described information transfer system: the electrical-equipment communication apparatus is incorporated into the electrical equipment; and the electrical-equipment communication apparatus controls the electrical equipment when the transmitting and receiving means of the electrical-equipment communication apparatus receives the request response information based on the connection-type protocol, or the request response information based on the connectionless-type protocol. According to this configuration, when the request response information based on the connection-type protocol, or the request response information based on the connectionless-type protocol is received, the electrical equipment which is connected to the electrical-equipment communication apparatus can be controlled.

In addition, in the above described information transfer system: the electrical-equipment communication apparatus is incorporated into the electrical equipment; and when the state of the electrical-equipment communication apparatus or the electrical equipment changes, the transmitting and receiving means of the electrical-equipment communication apparatus transmits the change information on the electrical-equipment communication apparatus or the electrical equipment to the transmission-origin address of the request response information based on the connection-type protocol, or the request response information based on the connectionless-type protocol, which is transmitted by the transmitting and receiving means of the information communication apparatus. According to this configuration, the information communication apparatus can receive change state data on the electrical-equipment communication apparatus or the electrical equipment which is connected to the electrical-equipment communication apparatus. Thereby, the state of the electrical-equipment communication apparatus or the electrical equipment which has been changed through the control can be recognized.

Furthermore, in the above described information transfer system: the electrical equipment includes a transmitting and receiving means for transmitting and receiving information to and from the electrical-equipment communication apparatus; and the transmitting and receiving means of the electrical-equipment communication apparatus receives the request response information based on the connection-type protocol, or the request response information based on the connectionless-type protocol, which is transmitted by the transmitting and receiving means of the information communication apparatus, and at the time, transmits a control signal to the transmitting and receiving means of the electrical equipment. According to this configuration, when the transmitting and receiving means of the electrical equipment receives the request response information based on the connection-type protocol or the request response information based on the connectionless-type protocol, it transmits a control signal to the transmitting and receiving means of the electrical equipment. Thereby, the electrical equipment connected to the electrical-equipment communication apparatus can be controlled.

Moreover, in the above described information transfer system: the electrical equipment includes a transmitting and receiving means for transmitting and receiving information to and from the electrical-equipment communication apparatus; the transmitting and receiving means of the electrical equipment transmits change information which indicates a change in the state of the electrical equipment to the transmitting and receiving means of the electrical-equipment communication apparatus; the transmitting and receiving means of the electrical-equipment communication apparatus receives the change information; and when the state of the electrical-equipment communication apparatus or the electrical equipment changes, the transmitting and receiving means of the electrical-equipment communication apparatus transmits the change information on the electrical-equipment communication apparatus or the electrical equipment to the transmission-origin address of the request response information based on the connection-type protocol, or the request response information based on the connectionless-type protocol, which is transmitted by the transmitting and receiving means of the information communication apparatus. According to this configuration, the information communication apparatus can receive change state data on the electrical-equipment communication apparatus or the electrical equipment which is connected to the electrical-equipment communication apparatus. Thereby, the state of the electrical-equipment communication apparatus or the electrical equipment which has been changed through the control can be recognized.

In addition, in the above described information transfer system, the transmitting and receiving means of the electrical-equipment communication apparatus transmits the information based on the connectionless-type protocol periodically to the address of the information communication apparatus. According to this configuration, the electrical-equipment communication apparatus can certainly transfer the information based on the connectionless-type protocol periodically to the information communication apparatus.

Furthermore, in the above described information transfer system, according to the time from the establishment of a session to the opening of the session, the transmitting and receiving means of the electrical-equipment communication apparatus sets a time interval from the transmission of the information based on the connectionless-type protocol to the next transmission of the information based on the connectionless-type protocol.

According to this configuration, a time interval from the transmission of the information based on the connectionless-type protocol to the next transmission of the information based on the connectionless-type protocol is set according to the time from the establishment of a session to the opening of the session. Therefore, the session can always be kept established, thus avoiding a state where the session stays opened. This is especially effective in a case where the session is automatically opened.

Moreover, in the above described information transfer system, the transmitting and receiving means of the electrical-equipment communication apparatus detects the time from the establishment of a session to the opening of the session, and if the time is shorter than a predetermined time, notifies the electrical-equipment communication apparatus or the information communication apparatus that the time when the session is establish is shorter.

According to this configuration, the time is detected from the establishment of a session to the opening of the session. If the detected time is shorter than a predetermined time, the electrical-equipment communication apparatus or the information communication apparatus is notified that the time when the session is establish is shorter. Therefore, the amount of information which flows for a fixed time on a network can be reduced, thus preventing a delay or a loss of information.

In the information transfer method according to the present invention where an electrical-equipment communication apparatus that communicates with electrical equipment and an information communication apparatus that is communicably connected, via a network, to the electrical-equipment communication apparatus transfer information mutually: the electrical-equipment communication apparatus includes a transmitting and receiving means for transmitting and receiving information, via the network, to and from the information communication apparatus; the information communication apparatus includes a transmitting and receiving means for transmitting and receiving information via the network to and from the electrical-equipment communication apparatus, and a trigger generating means for generating a communication request trigger which requests to communicate with the electrical-equipment communication apparatus; a transmitting step of, by using the transmitting and receiving means of the electrical-equipment communication apparatus, periodically transmitting information based on a connectionless-type protocol to the information communication apparatus; a receiving step of, by using the transmitting and receiving means of the information communication apparatus, receiving the information based on the connectionless-type protocol which is periodically transmitted by the transmitting and receiving means of the electrical-equipment communication apparatus; a trigger generating step of, by using the trigger generating means, generating the communication request trigger; and a transmitting step of, by using the transmitting and receiving means of the information communication apparatus, when the communication request trigger is generated in the trigger generating step, transmitting request response information based on the connectionless-type protocol, or request response information based on a connection-type protocol, to a transmission-origin address of the information based on the connectionless-type protocol.

According to this configuration, before a communication request is generated in the trigger generating means, the transmitting and receiving means of the information communication apparatus receives information based on a connectionless-type protocol which is periodically transmitted from the electrical-equipment communication apparatus. Thereby, the session remains connected between it and the transmitting and receiving means of the electrical-equipment communication apparatus. Therefore, the transmitting and receiving means of the information communication apparatus can issue, to the transmission-origin address of the information based on the connectionless-type protocol, request response information based on a connectionless-type protocol or request response information based on a connection-type protocol, instantly without waiting for information based on the following connectionless-type protocol. Thus, the information transfer can be executed without a time lag from the communication-request generation in the trigger generating means to the transmission of request response information based on the connectionless-type protocol, or the request response information based on the connection-type protocol. Therefore, the time interval can be shortened from the generation of a control request in the information communication apparatus to the transfer of information to the electrical-equipment communication apparatus. Thereby, information provision or control can be realized in real time.

In the electrical-equipment communication apparatus according to the present invention which is communicably connected, via a network, to an information communication apparatus that includes a transmitting and receiving means for transmitting and receiving information, via the network, and a trigger generating means for generating a communication request trigger which requests to communicate: a transmitting and receiving means is provided for transmitting and receiving information via the network to and from the information communication apparatus; and the transmitting and receiving means of the electrical-equipment communication apparatus periodically transmits information based on a connectionless-type protocol to the information communication apparatus, and after the communication request trigger is generated by the trigger generating means, receives request response information based on the connectionless-type protocol, or request response information based on a connection-type protocol, which is transmitted to a transmission-origin address of the information based on the connectionless-type protocol by the transmitting and receiving means of the information communication apparatus.

According to this configuration, before a communication request is generated in the trigger generating means, the transmitting and receiving means of the information communication apparatus receives information based on a connectionless-type protocol which is periodically transmitted from the electrical-equipment communication apparatus. Thereby, the session remains connected between it and the transmitting and receiving means of the electrical-equipment communication apparatus. Therefore, the transmitting and receiving means of the information communication apparatus can issue, to the transmission-origin address of the information based on the connectionless-type protocol, request response information based on a connectionless-type protocol or request response information based on a connection-type protocol, instantly without waiting for following information based on the connectionless-type protocol. Thus, the information transfer can be executed without a time lag from the communication-request generation in the trigger generating means to the transmission of request response information based on the connectionless-type protocol, or the request response information based on the connection-type protocol. Therefore, the time interval can be shortened from the generation of a control request in the information communication apparatus to the transfer of information to the electrical-equipment communication apparatus. Thereby, information provision or control can be realized in real time.

In the information communication apparatus according to the present invention which is communicably connected, via a network, to an electrical-equipment communication apparatus that includes a transmitting and receiving means for transmitting and receiving information via the network: a transmitting and receiving means is provided for transmitting and receiving information, via the network, to and from the electrical-equipment communication apparatus; a trigger generating means is provided for generating a communication request trigger which requests to communicate with the electrical-equipment communication apparatus; and the transmitting and receiving means of the information communication apparatus receives the information based on the connectionless-type protocol which is periodically transmitted by the transmitting and receiving means of the electrical-equipment communication apparatus, and when the communication request trigger is generated by the trigger generating means, transmits request response information based on the connectionless-type protocol, or request response information based on a connection-type protocol, to a transmission-origin address of the information based on the connectionless-type protocol.

According to this configuration, before a communication request is generated in the trigger generating means, the transmitting and receiving means of the information communication apparatus receives information based on a connectionless-type protocol which is periodically transmitted from the electrical-equipment communication apparatus. Thereby, the session remains connected between it and the transmitting and receiving means of the electrical-equipment communication apparatus. Therefore, the transmitting and receiving means of the information communication apparatus can issue, to the transmission-origin address of the information based on the connectionless-type protocol, request response information based on a connectionless-type protocol or request response information based on a connection-type protocol, instantly without waiting for information based on the following connectionless-type protocol. Thus, the information transfer can be executed without a time lag from the communication-request generation in the trigger generating means to the transmission of request response information based on the connectionless-type protocol, or the request response information based on the connection-type protocol. Therefore, the time interval can be shortened from the generation of a control request in the information communication apparatus to the transfer of information to the electrical-equipment communication apparatus. Thereby, information provision or control can be realized in real time.

In the computer-readable recording medium with the communication control program according to the present invention for controlling an electrical-equipment communication apparatus which is communicably connected, via a network, to an information communication apparatus that includes a transmitting and receiving means for transmitting and receiving information, via the network, and a trigger generating means for generating a communication request trigger which requests to communicate: the communication control program allows a computer to function as a transmitting and receiving means for transmitting and receiving information, via the network, to and from the information communication apparatus; and the transmitting and receiving means of the electrical-equipment communication apparatus periodically transmits information based on a connectionless-type protocol to the information communication apparatus, and after the communication request trigger is generated by the trigger generating means, receives request response information based on the connectionless-type protocol, or request response information based on a connection-type protocol, which is transmitted to a transmission-origin address of the information based on the connectionless-type protocol by the transmitting and receiving means of the information communication apparatus.

According to this configuration, before a communication request is generated in the trigger generating means, the transmitting and receiving means of the information communication apparatus receives information based on a connectionless-type protocol which is periodically transmitted from the electrical-equipment communication apparatus. Thereby, the session remains connected between it and the transmitting and receiving means of the electrical-equipment communication apparatus. Therefore, the transmitting and receiving means of the information communication apparatus can issue, to the transmission-origin address of the information based on the connectionless-type protocol, request response information based on a connectionless-type protocol or request response information based on a connection-type protocol, instantly without waiting for following information based on the connectionless-type protocol. Thus, the information transfer can be executed without a time lag from the communication-request generation in the trigger generating means to the transmission of request response information based on the connectionless-type protocol, or the request response information based on the connection-type protocol. Therefore, the time interval can be shortened from the generation of a control request in the information communication apparatus to the transfer of information to the electrical-equipment communication apparatus. Thereby, information provision or control can be realized in real time.

In the computer-readable recording medium with the communication control program according to the present invention for controlling an information communication apparatus which is communicably connected, via a network, to an electrical-equipment communication apparatus that includes a transmitting and receiving means for transmitting and receiving information via the network: the communication control program allows a computer to function as a transmitting and receiving means for transmitting and receiving information via the network to and from the electrical-equipment communication apparatus, and a trigger generating means for generating a communication request trigger which requests to communicate with the electrical-equipment communication apparatus; and the transmitting and receiving means of the information communication apparatus receives the information based on the connectionless-type protocol which is periodically transmitted by the transmitting and receiving means of the electrical-equipment communication apparatus, and when the communication request trigger is generated by the trigger generating means, transmits request response information based on the connectionless-type protocol, or request response information based on a connection-type protocol, to a transmission-origin address of the information based on the connectionless-type protocol.

According to this configuration, before a communication request is generated in the trigger generating means, the transmitting and receiving means of the information communication apparatus receives information based on a connectionless-type protocol which is periodically transmitted from the electrical-equipment communication apparatus. Thereby, the session remains connected between it and the transmitting and receiving means of the electrical-equipment communication apparatus. Therefore, the transmitting and receiving means of the information communication apparatus can issue, to the transmission-origin address of the information based on the connectionless-type protocol, request response information based on a connectionless-type protocol or request response information based on a connection-type protocol, instantly without waiting for following information based on the connectionless-type protocol. Thus, the information transfer can be executed without a time lag from the communication-request generation in the trigger generating means to the transmission of request response information based on the connectionless-type protocol, or the request response information based on the connection-type protocol. Therefore, the time interval can be shortened from the generation of a control request in the information communication apparatus to the transfer of information to the electrical-equipment communication apparatus. Thereby, information provision or control can be realized in real time.

The present invention has been described in detail, but the above description is an illustration in all aspects. Thus, the present invention is not limited to this. It will be seen that numerous variations which are not illustrated can be expected without departing from the scope of the present invention.

INDUSTRIAL APPLICABILITY

An information transfer system, an information transfer method, an electrical-equipment communication apparatus, an information communication apparatus and a computer-readable recording medium with a communication control program according to the present invention which are capable of shortening the interval of time from the generation of a control request in the information communication apparatus to the transfer of information to the electrical-equipment communication apparatus, and providing information or executing control in real time. The present invention is useful as an information transfer system, an information transfer method, an electrical-equipment communication apparatus, an information communication apparatus, a computer-readable recording medium with a communication control program and the like which allow a server that an information provider or the like has to transfer information via an information network to an information panel, or which transfer information via the information network so that the server can control the information panel itself, electrical equipment connected to the information panel or electrical equipment communicable to the information panel, or so that it can monitor their state.

The invention claimed is:

1. An information transfer system comprising:
   an electrical-equipment communication apparatus operable to communicate with electrical equipment; and
   an information communication apparatus communicably connected, via a network, to the electrical-equipment communication apparatus,
   wherein the electrical-equipment communication apparatus includes a transmitting and receiving means for transmitting and receiving information, via the network, to and from the information communication apparatus,
   wherein the information communication apparatus includes:
      a transmitting and receiving means for transmitting and receiving information, via the network, to and from the electrical-equipment communication apparatus; and
      a trigger generating means for generating a communication request trigger for requesting communication with the electrical-equipment communication apparatus,
   wherein the transmitting and receiving means of the electrical-equipment communication apparatus periodically transmits periodically-transmitted information including an address identifying a position, on the network, of the electrical-equipment communication apparatus, the address being sequentially switched, and the periodically-transmitted information being periodically transmitted to and received by the information communication apparatus based on a connectionless-type protocol,
   wherein, the transmitting and receiving means of the information communication apparatus receives the periodically-transmitted information, and when the communication request trigger is generated by the trigger generating means, transmits request information based on the connectionless-type protocol, to a transmission-origin address of the periodically-transmitted information, the request information indicating a request for obtaining, from the electrical-equipment communication apparatus, state information indicating a state of the electrical-equipment at a time when the communication request trigger is generated,
   wherein the transmitting and receiving means of the electrical-equipment communication apparatus receives the request information transmitted by the transmitting and receiving means of the information communication apparatus, and transmits request-confirmation information based on the connection-type protocol to the information communication apparatus, the request-confirmation information indicating the state of the electrical-equipment, and
   wherein the transmitting and receiving means of the information communication apparatus receives the request-confirmation information transmitted by the transmitting and receiving means of the electrical-equipment communication apparatus, and transmits the request-response information based on the connection-type protocol to the transmission-origin address of the request-confirmation information, the request-response information indicating a content of a control for the electrical-equipment included in the communication-request trigger generated by the trigger generating means.

2. The information transfer system according to claim 1, wherein the transmitting and receiving means of the electrical-equipment communication apparatus receives the request-response information, and transmits result information based on the connection-type protocol to the transmission-origin address of the request-response information.

3. The information transfer system according to claim 1, wherein the information communication apparatus includes a server communicably connected, via the network, to the electrical-equipment communication apparatus.

4. The information transfer system according to claim 1, wherein:
the information communication apparatus includes a server communicably connected, via the network, to the electrical-equipment communication apparatus, and includes an information terminal communicably connected, via the network, to the server;
the information terminal includes a transmitting means for transmitting the communication request trigger to the server;
the server includes a transmitting and receiving means for transmitting and receiving information, via the network, to and from the electrical-equipment communication apparatus;
the transmitting and receiving means of the server receives the periodically-transmitted information, and, when receiving the communication request trigger, the transmitting and receiving means of the server transmits the request information based on the connectionless-type protocol, to the transmission-origin address of the periodically-transmitted information, the request information indicating the request for obtaining, from the electrical-equipment apparatus, the state information indicating the state of the electrical-equipment at the time when the communication request trigger is generated;
the transmitting and receiving means of the electrical-equipment communication apparatus receives the request information transmitted by the transmitting and receiving means of the server, and transmits the request-confirmation information transmitted based on the connection-type protocol to the server, the request-confirmation information indicating the state of the electrical-equipment; and
the transmitting and receiving means of the server receives the request-confirmation information transmitted by the transmitting and receiving means of the electric-equipment communication apparatus, and transmits the request-response information based on the connection-type protocol to the transmission-origin address of the request-confirmation information, the request-response information indicating the content of the control for the electrical-equipment included in the communication-request trigger generated by the trigger generating means.

5. The information transfer system according to claim 4, wherein the transmitting and receiving means of the server receives result information, and transmits the result information as a result signal to the information terminal.

6. The information transfer system according to claim 1, wherein, at a time the transmitting and receiving means of the information communication apparatus receives the periodically-transmitted information, the transmitting and receiving means of the information communication apparatus transmits confirmation information based on (i) the connectionless-type protocol or (ii) the connection-type protocol, to the transmission-origin address of the periodically-transmitted information.

7. The information transfer system according to claim 1, wherein the transmitting and receiving means of the electrical-equipment communication apparatus receives (i) the request-response information based on the connectionless-type protocol or (ii) request information based on the connectionless-type protocol, transmitted by the transmitting and receiving means of the information communication apparatus, and at a time of receiving the request-response information or the request information, the transmitting and receiving means of the electrical-equipment communication apparatus transmits confirmation information based on (i) the connectionless-type protocol or (ii) the connection-type protocol.

8. The information transfer system according to claim 1, wherein:
the electrical-equipment communication apparatus is incorporated into the electrical equipment; and
the electrical-equipment communication apparatus controls the electrical equipment when the transmitting and receiving means of the electrical-equipment communication apparatus receives the request-response information based on (i) the connection-type protocol or (ii) the connectionless-type protocol.

9. The information transfer system according to claim 8, wherein when a state of the electrical-equipment communication apparatus or the state of the electrical equipment changes, the transmitting and receiving means of the electrical-equipment communication apparatus transmits change information associated with the electrical-equipment communication apparatus or the electrical equipment to the transmission-origin address of the request-response information based on (i) the connection-type protocol or (ii) the connectionless-type protocol.

10. The information transfer system according to claim 1, wherein:
the electrical equipment includes a transmitting and receiving means for transmitting and receiving information to and from the electrical-equipment communication apparatus; and
the transmitting and receiving means of the electrical-equipment communication apparatus receives the request-response information based on (i) the connection-type protocol or (ii) the connectionless-type protocol, and, at a time of receiving the request-response information, the transmitting and receiving means of the electrical-equipment communication apparatus transmits a control signal to the transmitting and receiving means of the electrical equipment.

11. The information transfer system according to claim 10, wherein:
the transmitting and receiving means of the electrical equipment transmits change information indicating a change in the state of the electrical equipment or a state of the electrical equipment communication apparatus, the change information being transmitted to the transmitting and receiving means of the electrical-equipment communication apparatus; and
when the state of the electrical-equipment communication apparatus or the electrical equipment changes, the transmitting and receiving means of the electrical-equipment communication apparatus transmits the change information associated with the electrical-equipment communication apparatus or the electrical equipment to the transmission-origin address of the request-response information based on (i) the connection-type protocol or (ii) the connectionless-type protocol.

12. The information transfer system according to claim 1, wherein according to a time from an establishment of a session to an opening of the session, the transmitting and receiving means of the electrical-equipment communication apparatus sets a time interval from the transmission of the periodically-transmitted information to a next transmission of the periodically-transmitted information.

13. The information transfer system according to claim 1, wherein the transmitting and receiving means of the electrical-equipment communication apparatus detects a time from an establishment of a session to an opening of the session, and, if the time is shorter than a predetermined time, then the transmitting and receiving means of the electrical-equipment communication apparatus notifies the electrical-equipment communication apparatus or the information communication apparatus that the time is shorter than the predetermined time.

14. An information transfer method in which an electrical-equipment communication apparatus communicates with electrical equipment, and an information communication apparatus is communicably connected, via a network, to the electrical-equipment communication apparatus, the electrical-equipment communication apparatus including a transmitting and receiving means for transmitting and receiving information, via the network, to and from the information communication apparatus, the information communication apparatus including a transmitting and receiving means for transmitting and receiving information, via the network, to and from the electrical-equipment communication apparatus and including a trigger generating means for generating a communication request trigger for requesting communication with the electrical-equipment communication apparatus, the information transfer method comprising:

a first transmitting step, for the transmitting and receiving means of the electrical-equipment communication apparatus, to periodically transmit periodically-transmitted information including an address identifying a position, on the network, of the electrical-equipment communication apparatus, the address being sequentially switched, and the periodically-transmitted information being periodically transmitted, to the information communication apparatus, based on a connectionless-type protocol;

a first receiving step, for the transmitting and receiving means of the information communication apparatus, to receive the periodically-transmitted information periodically transmitted based on a connectionless-type protocol;

a trigger generating step for, the trigger generating means, to generate the communication request trigger;

a second transmitting step, for the transmitting and receiving means of the information communication apparatus, to transmit request information based on the connectionless-type protocol to a transmission-origin address of the periodically-transmitted information when the communication request trigger is generated in the trigger generating step, the request information indicating a request for obtaining from the electrical-equipment communication apparatus, state information indicating a state of the electrical-equipment at a time when the communication request trigger is generated;

a second receiving step, for the transmitting and receiving means of the electrical-equipment communication apparatus, to receive the request information transmitted by the transmitting and receiving means of the information communication apparatus;

a third transmitting step, for the transmitting and receiving means of the electrical-equipment communication apparatus, to transmit request-confirmation information based on the connection-type protocol, to the information communication apparatus, the request-confirmation information indicating the state of the electrical-equipment;

a third receiving step, for the transmitting and receiving means of the information communication apparatus, to receive the request-confirmation information transmitted by the transmitting and receiving means of the electrical-equipment communication apparatus; and a fourth transmitting step, for the transmitting and receiving means of the information communication apparatus, to transmit request-response information based on the connection-type protocol to a transmission-origin address of the request-confirmation information, the request-response information indicating a content of a control for the electrical-equipment included in the communication-request trigger generated by the trigger generating means.

15. An electrical-equipment communication apparatus communicably connected, via a network, to an information communication apparatus including a transmitting and receiving means for transmitting and receiving information, via the network, and including a trigger generating means for generating a communication request trigger for requesting communication, the electrical-equipment communication apparatus comprising:

a transmitting and receiving means for transmitting and receiving information, via the network, to and from the information communication apparatus, wherein the transmitting and receiving means of the electrical-equipment communication apparatus periodically transmits periodically-transmitted information including an address identifying a position, on the network, of the electrical-equipment communication apparatus, the address being sequentially switched, and the periodically-transmitted information being periodically transmitted, to the information communication apparatus, based on a connectionless-type protocol, and wherein, after the communication request trigger is generated, the transmitting and receiving means of the electrical-equipment communication apparatus (i) receives request information based on the connectionless-type protocol transmitted to a transmission-origin address of the periodically-transmitted information by the transmitting and receiving means of the information communication apparatus, the request information indicating a request for obtaining, from the electrical-equipment communication apparatus, state information indicating a state of the electrical-equipment at a time when the communication request trigger is generated, (ii) transmits request-confirmation information based on the connection-type protocol to the information communication apparatus, the request-confirmation information indicating the state of the electrical-equipment, and (iii) receives request-response information based on the connection-type protocol transmitted by the transmitting and receiving means of the information communication apparatus to the transmission-origin address of the request-confirmation information, the request-response information indicating a content of a control for the electrical-equipment included in the communication-request trigger generated by the trigger generating means.

16. An information communication apparatus communicably connected, via a network, to an electrical-equipment communication apparatus including a transmitting and receiving means for transmitting and receiving information via the network, the information communication apparatus comprising:
- a transmitting and receiving means for transmitting and receiving information, via the network, to and from the electrical-equipment communication apparatus; and
- a trigger generating means for generating a communication request trigger for requesting communication with the electrical-equipment communication apparatus,
- wherein the transmitting and receiving means of the information communication apparatus receives periodically-transmitted information including an address identifying a position, on the network, of the electrical-equipment communication apparatus, the address being sequentially switched, and the periodically-transmitted information being periodically transmitted, from the transmitting and receiving means of the electrical-equipment communication apparatus, based on a connectionless-type protocol, and
- wherein, when the communication request trigger is generated by the trigger generating means, the transmitting and receiving means of the information communication apparatus (i) transmits request information based on the connectionless-type protocol to a transmission-origin address of the periodically-transmitted information, the request information indicating a request for obtaining, from the electrical-equipment communication apparatus, state information indicating a state of the electrical-equipment at a time when the communication request trigger is generated, (ii) receives request-confirmation information based on the connection-type protocol transmitted by the transmitting and receiving means of the electrical-equipment communication apparatus, the request-confirmation information indicating the state of the electrical-equipment and (iii) transmits request-response information based on the connection-type protocol to the transmission-origin address of the request-confirmation information, the request-response information indicating a content of a control for the electrical-equipment included in the communication-request trigger generated by the trigger generating means.

17. A computer-readable recording medium having a communication control program recorded thereon, the communication control program for controlling an electrical-equipment communication apparatus communicably connected, via a network, to an information communication apparatus including a transmitting and receiving means for transmitting and receiving information, via the network, and including a trigger generating means for generating a communication request trigger for requesting communication, the communication control program causing the electrical-equipment communication apparatus to execute a method comprising:
- transmitting and receiving information, via the network, to and from the information communication apparatus;
- periodically transmitting periodically-transmitted information including an address identifying a position, on the network, of the electrical-equipment communication apparatus, the address being sequentially switched, and the periodically-transmitted information being periodically transmitted, to the information communication apparatus, based on a connectionless-type protocol; and
- after the communication request trigger is generated, receiving request information based on the connectionless-type protocol transmitted to a transmission-origin address of the periodically-transmitted information by the transmitting and receiving means of the information communication apparatus, the request information indicating a request for obtaining, from the electrical-equipment communication apparatus, state information indicating a state of the electrical-equipment at a time when the communication request trigger is generated, transmitting request-confirmation information based on the connection-type protocol to the information communication apparatus, the request-confirmation information indicating the state of the electrical-equipment, and receiving request-response information based on the connection-type protocol transmitted to the transmission-origin address of the request-confirmation information by the transmitting and receiving means of the information communication apparatus, the request-response information indicating a content of a control for the electrical-equipment included in the communication-request trigger generated by the trigger generating means.

18. A computer-readable recording medium having a communication control program recorded thereon, the communication control program for controlling an information communication apparatus communicably connected, via a network, to an electrical-equipment communication apparatus including a transmitting and receiving means for transmitting and receiving information, via the network, the communication control program causing the information communication apparatus to execute a method comprising:
- transmitting and receiving information, via the network, to and from the electrical-equipment communication apparatus;
- generating a communication request trigger for requesting communication with the electrical-equipment communication apparatus;
- receiving periodically-transmitted information including an address identifying a position, on the network, of the electrical-equipment communication apparatus, the address being sequentially switched, and the periodically-transmitted information being periodically transmitted, from the transmitting and receiving means of the electrical-equipment communication apparatus, based on a connectionless-type protocol; and
- when the communication request trigger is generated, transmitting request information based on the connectionless-type protocol to a transmission-origin address of the periodically-transmitted information, the request information indicating a request for obtaining, from the electrical-equipment communication apparatus, state information indicating a state of the electrical-equipment at a time when the communication request trigger is generated, receiving request-confirmation information, based on the connection-type protocol, transmitted by the transmitting and receiving means of the electrical-equipment communication apparatus, the request-confirmation information indicating the state of the electrical-equipment, and transmitting request-response information based on the connection-type protocol to the transmission-origin address of the request-confirmation information, the request-response information indicating a content of a control for the electrical-equipment included in the communication-request trigger generated by the trigger generating means.

* * * * *